US010528247B2

(12) United States Patent
Abe

(10) Patent No.: US 10,528,247 B2
(45) Date of Patent: Jan. 7, 2020

(54) OPERATION SYSTEM HAVING TOUCH OPERATION ENABLING USE OF LARGE SCREEN AREA, OPERATION CONTROL METHOD, AND OPERATION CONTROL PROGRAM

(71) Applicant: KONAMI DIGITAL ENTERTAINMENT CO., LTD., Tokyo (JP)

(72) Inventor: Takahiro Abe, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 244 days.

(21) Appl. No.: 14/996,764

(22) Filed: Jan. 15, 2016

(65) Prior Publication Data

US 2016/0132209 A1   May 12, 2016

Related U.S. Application Data

(63) Continuation-in-part of application No. PCT/JP2014/069188, filed on Jul. 18, 2014.

(30) Foreign Application Priority Data

Jul. 19, 2013 (JP) ................................ 2013-151088

(51) Int. Cl.
*G06F 3/00* (2006.01)
*G06F 3/0488* (2013.01)
(Continued)

(52) U.S. Cl.
CPC .......... *G06F 3/0488* (2013.01); *G06F 3/0481* (2013.01); *G06F 3/0482* (2013.01); *G06F 3/04812* (2013.01); *G06F 3/04842* (2013.01)

(58) Field of Classification Search
CPC .. G06F 3/0481; G06F 3/04812; G06F 3/0482; G06F 3/04842; G06F 3/0488
See application file for complete search history.

(56) References Cited

U.S. PATENT DOCUMENTS 5,745,116 A * 4/1998 Pisutha-Arnond ........................... G06F 3/04883
715/821
8,806,383 B2 * 8/2014 Nguyen ................ G06F 3/0481
715/863
(Continued)

FOREIGN PATENT DOCUMENTS

CN     102844733 A    12/2012
CN     102880406 A    1/2013
(Continued)

OTHER PUBLICATIONS

Communication dated Dec. 20, 2016 from the Japanese Patent Office in counterpart Application No. 2013-151088.
(Continued)

*Primary Examiner* — Kieu D Vu
*Assistant Examiner* — Andrew Chung
(74) *Attorney, Agent, or Firm* — Sughrue Mion, PLLC

(57) ABSTRACT

An operation system includes a detector, an area designator, a selection item designator, and a display controller. The detector may be configured to detect an operation of touching a touch panel at a touch-position on the touch panel. The area designator may be configured to designate an area, which includes the touch-position at which the operation of touching the touch panel is detected, from a plurality of areas of the touch panel. The selection item designator may be configured to designate an associated set of selection items which is associated with the area designated by the area designator. The display controller may be configured to control the touch panel to display an operator which includes (Continued)

the associated set of selection items at or in the vicinity of the touch-position, at which the operation of touching the touch panel is detected by the detector.

9 Claims, 25 Drawing Sheets

(51) Int. Cl.
    *G06F 3/0482*     (2013.01)
    *G06F 3/0481*     (2013.01)
    *G06F 3/0484*     (2013.01)

(56) References Cited

U.S. PATENT DOCUMENTS

| | | | | |
|---|---|---|---|---|
| 9,250,797 | B2 * | 2/2016 | Roberts | G06F 3/04883 |
| 2008/0024451 | A1 * | 1/2008 | Aimi | G01C 21/3611 |
| | | | | 345/168 |
| 2008/0163119 | A1 * | 7/2008 | Kim | G06F 3/04886 |
| | | | | 715/840 |
| 2008/0244454 | A1 * | 10/2008 | Shibaike | G06F 3/0482 |
| | | | | 715/835 |
| 2010/0100849 | A1 * | 4/2010 | Fram | G06F 3/0236 |
| | | | | 715/835 |
| 2010/0162108 | A1 * | 6/2010 | Stallings | G06F 3/04817 |
| | | | | 715/702 |
| 2010/0169813 | A1 | 7/2010 | Chang | |
| 2010/0306702 | A1 * | 12/2010 | Warner | G06F 3/04817 |
| | | | | 715/811 |
| 2011/0016390 | A1 * | 1/2011 | Oh | G06F 3/0482 |
| | | | | 715/702 |
| 2011/0061023 | A1 * | 3/2011 | Kim | G06F 3/0416 |
| | | | | 715/810 |
| 2011/0083104 | A1 * | 4/2011 | Minton | G06F 3/04886 |
| | | | | 715/815 |
| 2011/0115722 | A1 * | 5/2011 | Mok | G06F 3/016 |
| | | | | 345/173 |
| 2011/0138275 | A1 * | 6/2011 | Yu | G06F 3/04817 |
| | | | | 715/702 |
| 2011/0209093 | A1 * | 8/2011 | Hinckley | G06F 3/04817 |
| | | | | 715/834 |
| 2011/0250966 | A1 * | 10/2011 | Ohara | A63F 13/5375 |
| | | | | 463/36 |
| 2011/0276879 | A1 * | 11/2011 | Ando | G06F 3/0488 |
| | | | | 715/702 |
| 2012/0004902 | A1 * | 1/2012 | Sorkey | G16H 10/60 |
| | | | | 704/9 |
| 2012/0019446 | A1 * | 1/2012 | Wu | G06F 3/018 |
| | | | | 345/168 |
| 2012/0212450 | A1 | 8/2012 | Takami | |
| 2013/0019175 | A1 * | 1/2013 | Kotler | G06F 3/0482 |
| | | | | 715/728 |
| 2013/0019205 | A1 * | 1/2013 | Gil | G06F 3/04812 |
| | | | | 715/834 |
| 2013/0104079 | A1 * | 4/2013 | Yasui | G06F 3/0482 |
| | | | | 715/834 |
| 2013/0132904 | A1 * | 5/2013 | Primiani | G06F 3/048 |
| | | | | 715/834 |
| 2013/0212529 | A1 * | 8/2013 | Amarnath | G06F 3/017 |
| | | | | 715/810 |
| 2013/0219340 | A1 * | 8/2013 | Linge | G06F 3/0482 |
| | | | | 715/834 |
| 2013/0346923 | A1 * | 12/2013 | Ku | G06F 3/04842 |
| | | | | 715/835 |
| 2014/0013276 | A1 * | 1/2014 | Butterworth | G06F 3/04886 |
| | | | | 715/821 |
| 2014/0075388 | A1 * | 3/2014 | Kuscher | G06F 3/0482 |
| | | | | 715/834 |
| 2014/0109024 | A1 | 4/2014 | Miyazaki | |
| 2014/0181753 | A1 * | 6/2014 | Kamii | G06F 3/04883 |
| | | | | 715/840 |

FOREIGN PATENT DOCUMENTS

| | | |
|---|---|---|
| JP | 09-171378 A | 6/1997 |
| JP | 2010152859 A | 7/2010 |
| JP | 2011-090532 A | 5/2011 |
| JP | 2012185710 A | 9/2012 |
| JP | 2013-025357 A | 2/2013 |
| JP | 2014-523157 A | 9/2014 |
| WO | 2013/000296 A1 | 1/2013 |

OTHER PUBLICATIONS

Communication dated Jan. 2, 2018 from the State Intellectual Property Office of the P.R.C. in counterpart Application No. 201480040255.9.

Communication dated Sep. 27, 2018 from the State Intellectual Property Office of the P.R.C. in counterpart Application No. 201480040255.9.

Communication dated Jun. 6, 2019, from the State Intellectual property Office of the P.R.C in counterpart application No. 201480040255.9.

* cited by examiner

FIG. 9

SELECTION ITEM INFORMATION

| AREA ID | FIRST SELECTION ITEM | SECOND SELECTION ITEM | THIRD SELECTION ITEM | FOURTH SELECTION ITEM | FIFTH SELECTION ITEM | SIXTH SELECTION ITEM | ... |
|---|---|---|---|---|---|---|---|
| a1 | ☺ | ☺ | ☺ | ☞ | ♫ | 🤝 | ... |
| a2 | ⊖ | ☹ | ☹ | ⚑ | 📷 | ⊘ | ... |
| ... | ... | ... | ... | ... | ... | ... | ... |

FIG. 10

AREA INFORMATION

| AREA ID | AREA RANGE INFORMATION | ... |
|---|---|---|
| a1 | b1、b2、b3、b4 | ... |
| a2 | b3、b4、b5、b6 | ... |
| ... | ... | ... |

FIG. 22

SELECTION ITEM INFORMATION

| AREA ID | FIRST SELECTION ITEM | SECOND SELECTION ITEM | THIRD SELECTION ITEM | FOURTH SELECTION ITEM | FIFTH SELECTION ITEM | SIXTH SELECTION ITEM |
|---|---|---|---|---|---|---|
| a11 | 🙂 | 😋 | 😋 | 👉 | 👌 | 🤝 |
| ... | ... | ... | ... | ... | ... | ... |
| a13 | ⚛ | 🙂 | ✨ | 🏷 | 🙂 | ✊ |
| ... | ... | ... | ... | ... | ... | ... |

| SEVENTH SELECTION ITEM | EIGHTH SELECTION ITEM | NINTH SELECTION ITEM | TENTH SELECTION ITEM | ELEVENTH SELECTION ITEM | TWELFTH SELECTION ITEM |
|---|---|---|---|---|---|
| 😋 | 😋 | 😋 | 😋 | 🤐 | 😋 |
| ... | ... | ... | ... | ... | ... |
| ☀ | 😷 | 👉 | 🐱 | 👮 | 🍬 |
| ... | ... | ... | ... | ... | ... |

FIG. 23

AREA INFORMATION

| AREA ID | AREA RANGE INFORMATION | ... |
|---|---|---|
| a11 | b11、b12、b13、b14 | ... |
| a12 | b13、b14、b15、b16 | ... |
| a13 | b15、b16、b17、b18 | ... |
| ... | ... | ... |

OPERATION SYSTEM HAVING TOUCH OPERATION ENABLING USE OF LARGE SCREEN AREA, OPERATION CONTROL METHOD, AND OPERATION CONTROL PROGRAM

TECHNICAL FIELD

The disclosure generally relates to an operation system, an operation control method, and an operation control program.

RELATED ART

Computers, such as personal computers, mobile telephone handsets, portable game consoles, arcade game machines, having a touch panel that integrates the operation input function and the image display function are provided, and various applications can be operated by such computers. RPG applications (role-playing games) running in mobile telephone handsets (smartphones) having a touch panel have been known. In these applications, the screen area on the touch panel is divided between a rectangular area (game screen area) in the center of the display screen that displays images operated by characters and the like and an area (operator display area) in which the images of virtual operators and the like are displayed in periphery. An application accepts input of operation instructions by operations of operators displayed in the operator display area.

However, if the game screen area and the operator display area are divided beforehand to display as described above, a part of the screen area is always occupied by the operator display area, thereby reducing the game screen area. In this case, it can be envisioned that it is desirable, in order to provide better appearance and rich expression, to establish as large a game screen area as possible. Given this, it is desirable that diverse input be enabled, while avoiding as much as possible the operators interfering with other display areas.

SUMMARY

In one embodiment, an operation system may include, but is not limited to, a detector, an area designator, a selection item designator, and a display controller. The detector may be configured to detect an operation of touching a touch panel at a touch-position on the touch panel. The area designator may be configured to designate an area, which includes the touch-position at which the operation of touching the touch panel is detected, from a plurality of areas of the touch panel. The selection item designator may be configured to designate an associated set of selection items which is associated with the area designated by the area designator. The display controller may be configured to control the touch panel to display an operator which includes the associated set of selection items at or in the vicinity of the touch-position, at which the operation of touching the touch panel is detected by the detector.

BRIEF DESCRIPTIONS OF THE DRAWINGS

FIG. 9 is a table of an example of selection items in accordance with the first embodiment of the invention;

FIG. 10 is a table of an example of data of area information in accordance with the first embodiment of the invention;

FIG. 22 is a table of an example of selection items in accordance with the fourth embodiment of the invention;

FIG. 23 is a table of an example of data of area information in accordance with the fourth embodiment of the invention;

DETAILED DESCRIPTIONS

Embodiments

Figure 1:
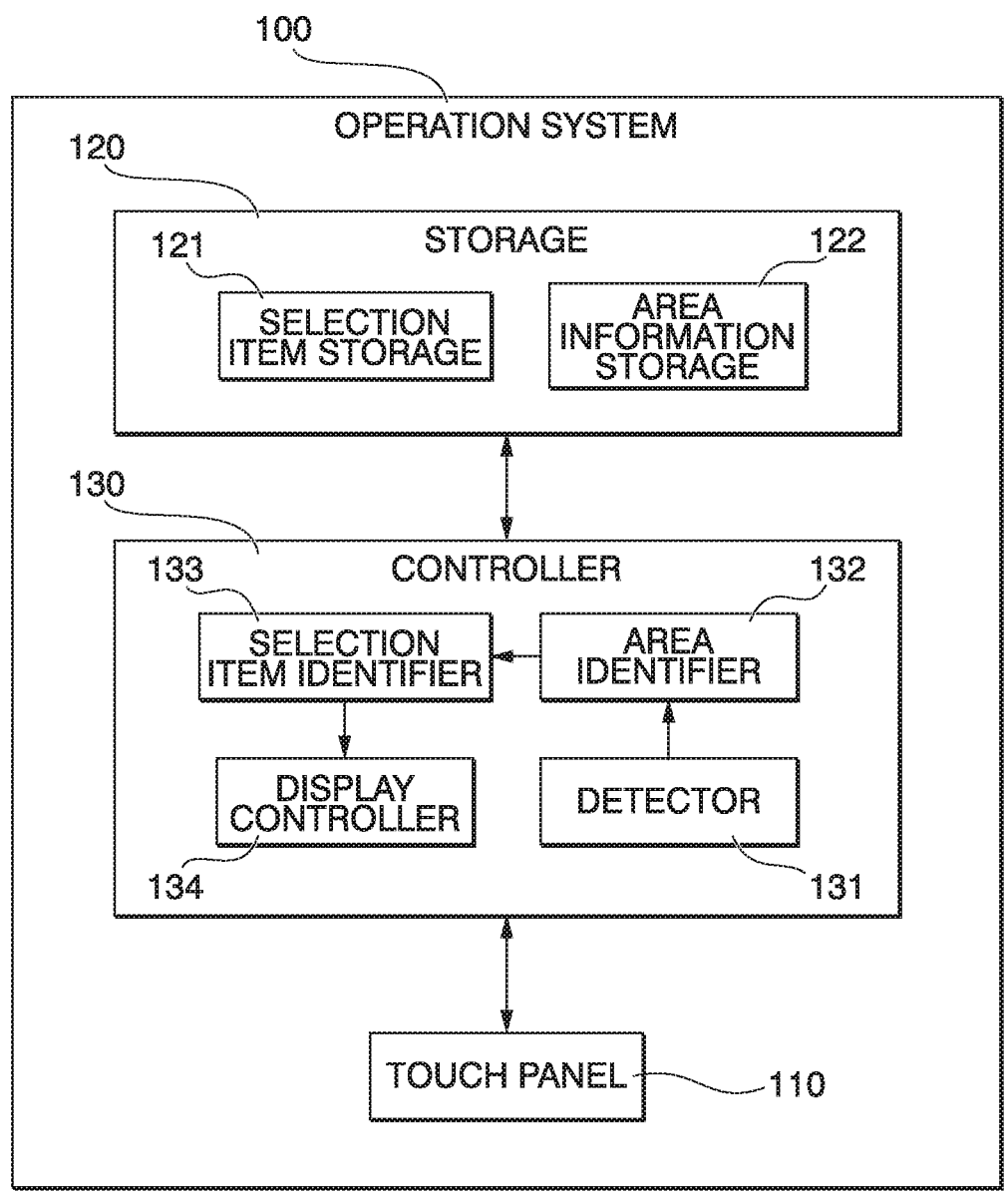
FIG. 1 is a block diagram illustrating an internal configuration of an operation system in accordance with a first embodiment of the invention.

In one embodiment, an operation system may include, but is not limited to, a detector, an area designator, a selection item designator, and a display controller. The detector may be configured to detect an operation of touching a touch panel at a touch-position on the touch panel. The area designator may be configured to designate an area, which includes the touch-position at which the operation of touching the touch panel is detected, from a plurality of areas of the touch panel. The selection item designator may be configured to designate an associated set of selection items which is associated with the area designated by the area designator. The display controller may be configured to control the touch panel to display an operator which includes the associated set of selection items at or in the vicinity of the touch-position, at which the operation of touching the touch panel is detected by the detector.

In some cases, the display controller is configured to control the touch panel to remove the display of the operator in a case that the detector has no longer detected the touch-position within the area in which the operator has been displayed.

In some cases, the display controller is configured to control the touch panel to display a plurality of guide images, each guide image indicating a range of a respective area of the plurality of areas of the touch panel.

In some cases, the display controller is configured to control the touch panel to display an operator which includes the set of selection items by the selection item designator, the set of selection items further including colored item images which are different in color depending upon different areas of the plurality of areas of the touch panel. The display controller is configured to control the touch panel to display the plurality of guide images which are different in color depending upon different colors of the colored item images.

In some cases, the operation system may further include, but is not limited to, a selection item changer configured to change the set of selection items into another set of selection items to be displayed on the pouch panel by the display controller, in a case that the detector has detected the touch-position on the touch panel continuously over a period of time.

In some cases, the operation system may further include, but is not limited to, a storage that stores plural sets of selection items and respective identifiers identifying the plurality of areas of the pouch panel, each set of selection items being associated with a respective identifier which identifies a respective area of the plurality of areas of the pouch panel.

In some cases, the selection item designator is configured to read, out of the storage, a set of selection items, which is associated with an identifier identifying the area designated by the area designator. The display controller is configured to control the touch panel to display, at or in the vicinity of the touch-position, an operator including the set of selection items that have been read out the storage by the selection item designator.

In an additional embodiment, an operation system may include, but is not limited to, one or more memories, one or more software components stored in the one or more memories, and one or more hardware processors configured to execute the one or more software components to perform detecting an operation of touching a touch panel at a touch-position on the touch panel; designating an area, which includes the touch-position at which the operation of touching the touch panel is detected, from a plurality of areas of the touch panel; designating an associated set of selection items which is associated with the area designated; and controlling the touch panel to display an operator which includes the associated set of selection items at or in the vicinity of the touch-position, at which the operation of touching the touch panel is detected.

In an additional embodiment, an operation system may include, but is not limited to, circuitry configured to detect an operation of touching a touch panel at a touch-position on the touch panel; designate an area, which includes the touch-position at which the operation of touching the touch panel is detected, from a plurality of areas of the touch panel; designating an associated set of selection items which is associated with the area designated; and control the touch panel to display an operator which includes the associated set of selection items at or in the vicinity of the touch-position, at which the operation of touching the touch panel is detected.

In another embodiment, an operation control method may include, but is not limited to, detecting, by an operation system, an operation of touching a touch panel at a touch-position on the touch panel; designating, by the operation system, an area, which includes the touch-position at which the operation of touching the touch panel is detected, from a plurality of areas of the touch panel; designating, by the operation system, an associated set of selection items which is associated with the area designated; and controlling, by the operation system, the touch panel to display an operator which includes the associated set of selection items at or in the vicinity of the touch-position, at which the operation of touching the touch panel is detected.

In still another embodiment, a non-transitory computer readable storage medium that stores a computer program to be executed by a computer to perform a management method which may include, but is not limited to, detecting an operation of touching a touch panel at a touch-position on the touch panel; designating an area, which includes the touch-position at which the operation of touching the touch panel is detected, from a plurality of areas of the touch panel; designating an associated set of selection items which is associated with the area designated; and controlling the touch panel to display an operator which includes the associated set of selection items at or in the vicinity of the touch-position, at which the operation of touching the touch panel is detected.

In yet another embodiment, an operation terminal may include, but is not limited to, a detector, and a display controller. The detector may be configured to detect an operation of touching a touch panel at a touch-position on the touch panel. The display controller may be configured to control the touch panel to display, based on an area information and a position information, an operator which includes an associated set of selection items at or in the vicinity of the touch-position, at which the operation of touching the touch panel is detected by the detector, the operator being associated with an area which includes the touch-position, the area being included in a plurality of areas of the touch panel, the area information defining extents of the plurality of areas of the touch panel, and the position information being related to the touch-position, at which the operation of touching the touch panel is detected by the detector.

In an additional embodiment, an operation terminal may include, but is not limited to, one or more memories, one or more software components stored in the one or more memories, and one or more hardware processors configured to execute the one or more software components to perform: detecting an operation of touching a touch panel at a touch-position on the touch panel; and controlling the touch panel to display, based on an area information and a position information, an operator which includes an associated set of selection items at or in the vicinity of the touch-position, at which the operation of touching the touch panel is detected. The operator is associated with an area which includes the touch-position. The area is included in a plurality of areas of the touch panel. The area information defines extents of the plurality of areas of the touch panel, and the position information being related to the touch-position, at which the operation of touching the touch panel is detected.

In an additional embodiment, an operation terminal may include, but is not limited to, circuitry configured to detect an operation of touching a touch panel at a touch-position on the touch panel; and control the touch panel to display, based on an area information and a position information, an operator which includes an associated set of selection items at or in the vicinity of the touch-position, at which the operation of touching the touch panel is detected. The operator is associated with an area which includes the touch-position. The area is included in a plurality of areas of the touch panel. The area information defines extents of the plurality of areas of the touch panel, and the position information being related to the touch-position, at which the operation of touching the touch panel is detected.

In yet another embodiment, an operation server may include, but is not limited to, an area designator and a selection item designator. The area designator may be configured to designate an area, which includes a touch-position at which an operation of touching a touch panel is detected, based on an area information and a position information, the area information defining extents of a plurality of areas of the touch panel, and the position information being related to the touch-position. The selection item designator may be configured to designate an associated set of selection items which is associated with the area designated by the area designator.

In some cases, the operation system may further include, but is not limited to, a storage that stores the associated set of selection items in association with an identifier which identifies the area of the plurality of areas of the touch-panel.

In some cases, the selection item designator is configured to read the associated set of selection items out of the storage, based on the identifier which identifies the area designated by the area designator, the associated set of selection items being associated with the area designated by the area designator.

In an additional embodiment, an operation server may include, but is not limited to, one or more memories, one or more software components stored in the one or more memories, and one or more hardware processors configured to execute the one or more software components to perform: designating an area, which includes a touch-position at which an operation of touching a touch panel is detected, based on an area information and a position information, the area information defining extents of a plurality of areas of the touch panel, and the position information being related to the touch-position; and designating an associated set of selection items which is associated with the area designated.

In an additional embodiment, an operation terminal may include, but is not limited to, circuitry configured to designate an area, which includes a touch-position at which an operation of touching a touch panel is detected, based on an area information and a position information, the area information defining extents of a plurality of areas of the touch panel, and the position information being related to the touch-position; and designate an associated set of selection items which is associated with the area designated.

Illustrative embodiments of the present invention will be described below, with references made to the drawings.

First Embodiment

FIG. 1 is a block diagram showing the constitution of an operation system 100 according to the present embodiment. In the present embodiment, the operation system 100 will be described as being a single computer. The operation system 100, for example, can use a computer, such as an arcade game machine, a game machine, a portable game console, a smartphone (mobile telephone handset), a tablet PC (personal computer), or a personal computer.

The operation system 100 has a touch panel 110 as an example of an operation panel, a storage 120, and a controller 130. The controller 130 controls the display of operators for accepting operations with respect to the application.

The touch panel 110 is an input/output device with a function of a display unit that displays information such as images and characters and a function of an input unit that accepts an operation input from a user and generates an input signal. The operating method of the touch panel 110 may be any one of a resistive film type, a surface acoustic wave type, infrared type, electromagnetic induction type, and capacitive type, or the like.

Figure 2:
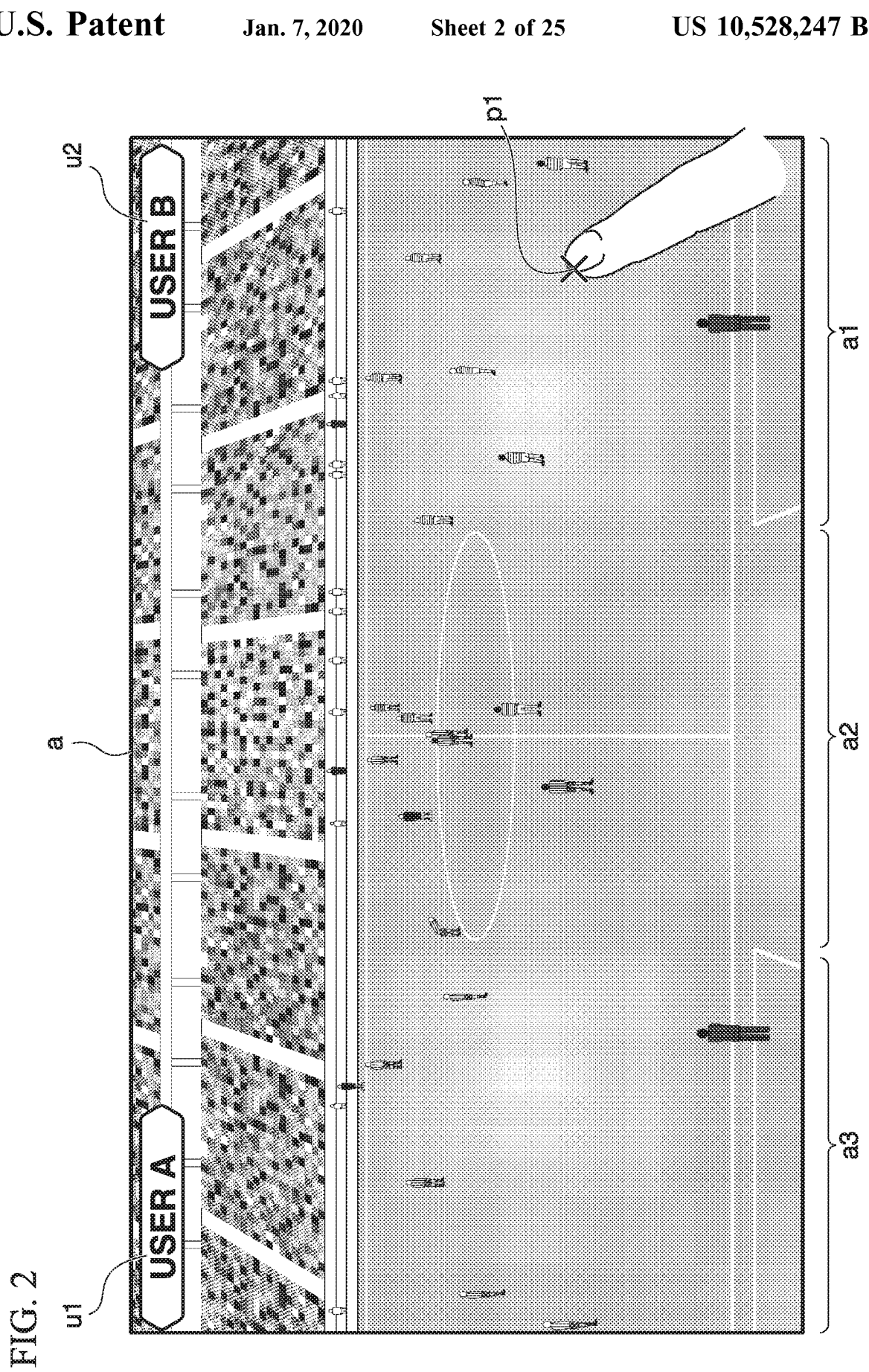
FIG. 2 is a view of an image displayed on a touch panel when any operation of touching the touch panel is not detected in accordance with the first embodiment of the invention.

The present embodiment will now be generally described. FIG. 2 shows an example of the screen displayed by the touch panel 110 according to the present embodiment. In this case, what is shown is an example of a screen of a soccer game application in which user A and user B compete. This application operates in the operation system 100 operated by user A, who is the local user and the operation system 100 operated by user B, who is the opponent of user A, and displays the application screen in accordance with each user while operation systems 100 mutually communicate. Therefore, the operation system 100 has a function of communicating with another operation system 100 or a server (not shown). Using the communication function to communicate with another operation system 100 or a server (not shown), it is possible to implement competition between user A and user B.

The application has icon chat function that displays a selected icon of a plurality of icons by one user on the screen of the opponent user during a game. An icon chat is a function that promotes communication between users by, for example, having users send to each other icons that express a user emotion or message by means of images or the like. In the present embodiment, an example in which the operation system 100 controls the display of operators for selection of icons to be displayed on the screen of an opponent user in an icon chat of this nature will be described.

In the soccer game application in the present embodiment, character operations are taken as being performed by buttons and operation levers or the like of an operation unit that is not illustrated. However, this is not a restriction, and the operation unit for making character operations may use the touch panel 110 or a combination of the touch panel 100 and buttons, operation levers, or the like.

The screen area a of the touch panel 100 displays the label u1 indicating the user name of the user him/herself (user A) in the upper-left and the label u2 indicating the user name of the opponent user (user B) in the upper-right. In the present embodiment, the screen area a is divided into the first partial area a1, the second partial area a2, and the third partial area a3, and the display of operators therein is controlled. First, the example of a case in which a touch operation is made at the point p1 in the first partial area a1 will be described. In the drawing, the × mark indicating the point p1 at which a touch operation has been made is shown for the purpose of describing the position at which the touch operation is made, and it not actually displayed on the screen. This will apply in the other screen examples to be presented.

Figure 3:
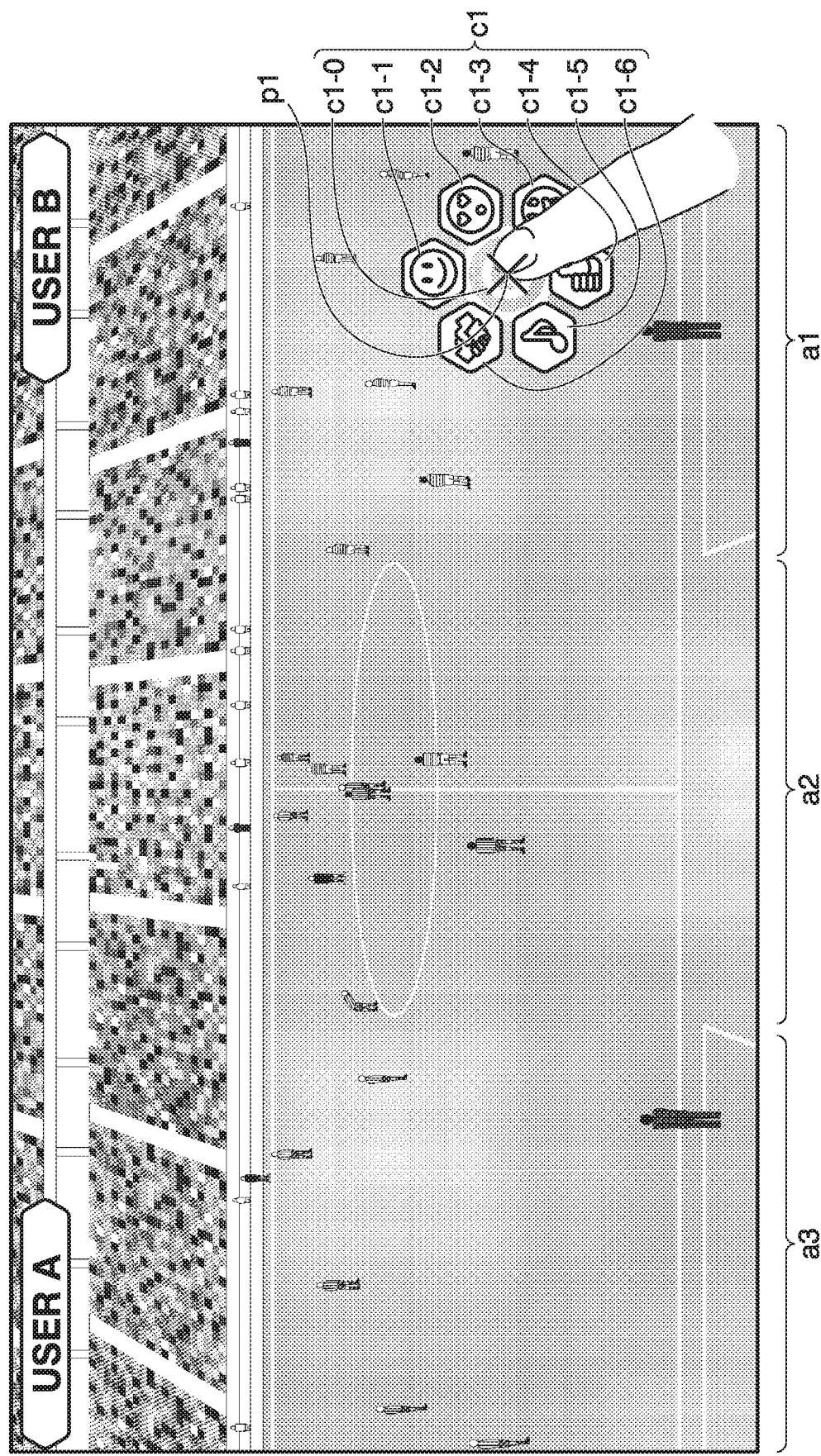
FIG. 3 is a view of an image displayed on a touch panel when an operation of touching a first area of the touch panel is detected in accordance with the first embodiment of the invention.

FIG. 3 is a drawing showing a screen example for a case in which a touch operation at the point p1 in the first partial area a1 of the touch point 110 is detected (with a finger touching the touch panel 110). In this case, the touch panel 110 displays a first operator c1 at the position of the point p1 in the first partial area a1. The first operation item c1 includes, centered on and surrounding the indicator c1-0 indicating the touch position at which the touch operation was made, a first selection item c1-1, a second selection item c1-2, a third selection item c1-3, a fourth selection item c1-4, a fifth selection item c1-5, and a sixth selection item c1-6. The plurality of selection items indicate icons that can be displayed on the other user's screen in an icon chat. The user selects any icon of the plurality of icons displayed in this manner.

Figure 4:
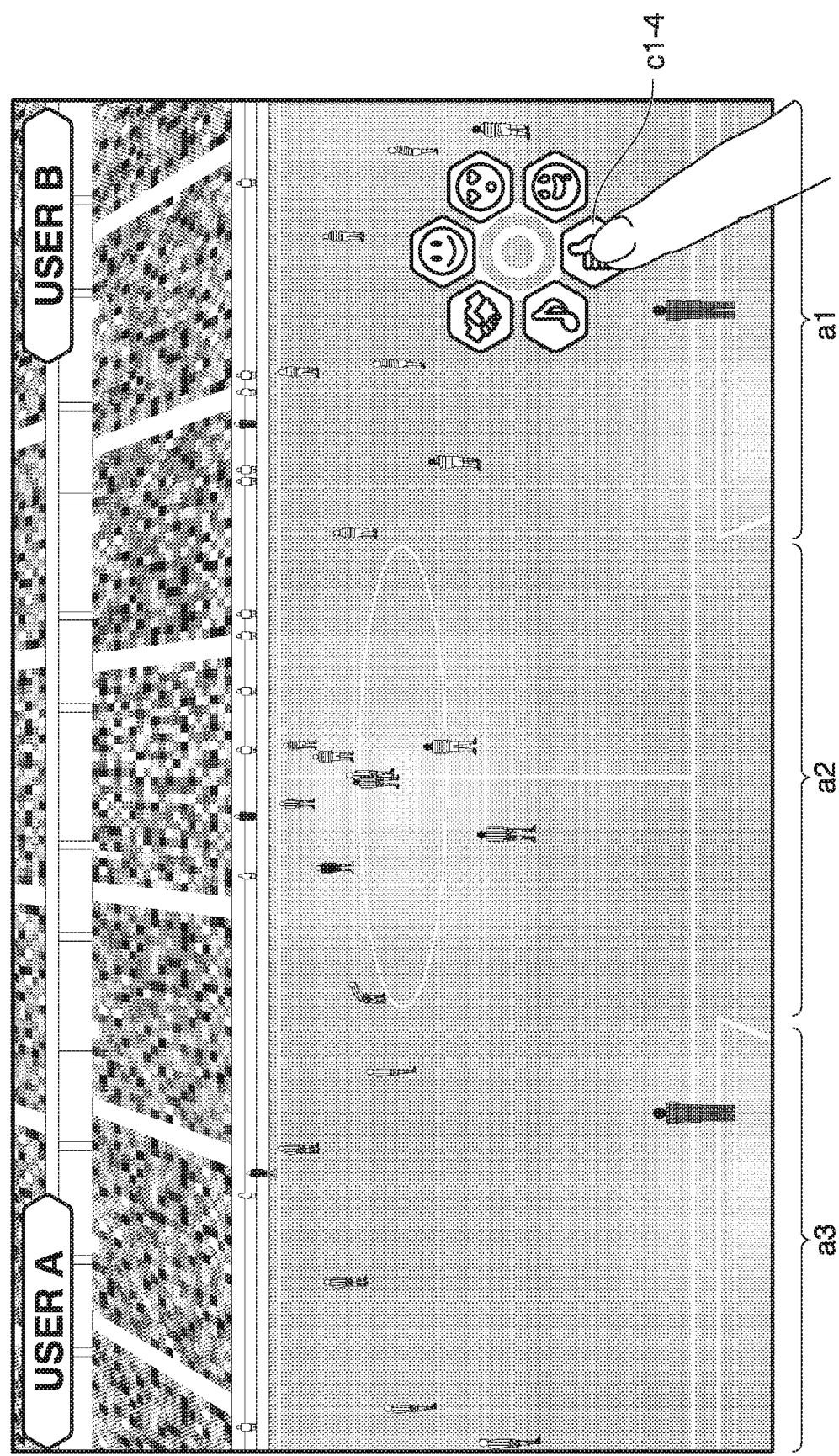
FIG. 4 is a view of an image displayed on a touch panel when an operation of sliding over the touch panel to move touch-position over the touch panel is detected in accordance with the first embodiment of the invention.

If the touch position at the first operation item c1 displayed by the touch panel 110 slides and then is no longer detected over one of the selection items (if the finger is released from the touch panel 110), the operation system 100 accepts input of an operation instruction indicating selection of that selection item. FIG. 4 shows an example of a case in which the touch position slides (is flicked) from the index c1-0 to the fourth selection item c1-4. For example, if, at the first operation item c1 displayed by the touch panel 110 the touch position slide and the touch position is no longer detected at the fourth selection item c1-4, the operation system 100 accepts input of an operation instruction indicating selection of the fourth selection item c1-4 of the plurality of selection items.

Figure 5:
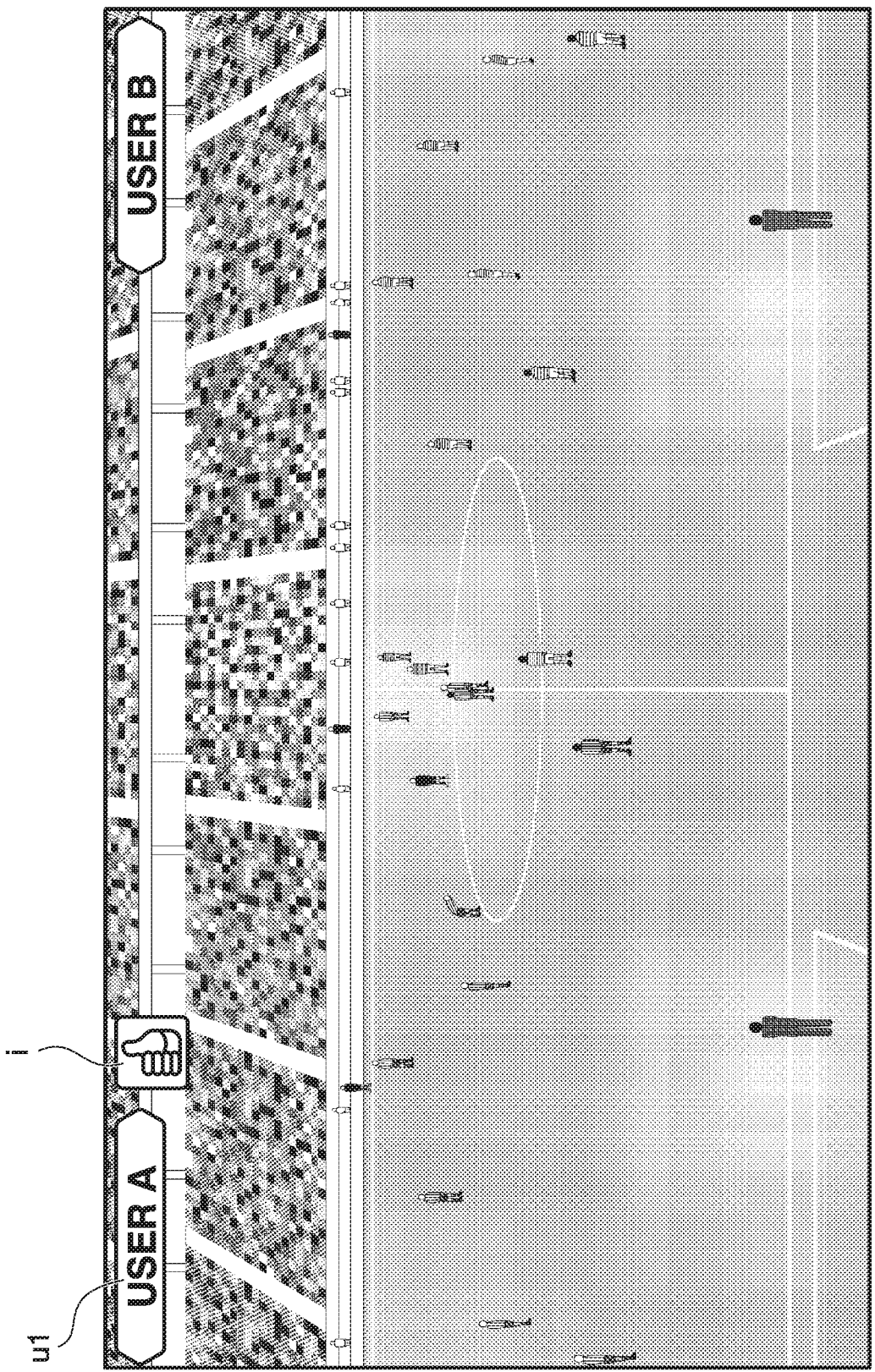
FIG. 5 is a view of another image including a selected icon displayed on another touch panel of another user.

FIG. 5 shows an example of a screen of the other user on which an icon selected in this manner is displayed. For example, if user A selects the fourth selection item c1-4 in the operation system 100, on the screen of the other user (user B), the icon i selected by user A is displayed in the vicinity of the label u1 that indicates the name of user A. In the same manner, if user B selects an icon chat selection item in the operation system 100, on the screen of user A, who is the other user as seen from user B, the icon selected by user B is displayed in the vicinity of the label u2 that indicates the name of user B. In this manner, an icon that is an icon chat selection item selected by a user is displayed on the other user's screen, thereby enabling competing opponents to communicate with each other by icons.

Figure 6:
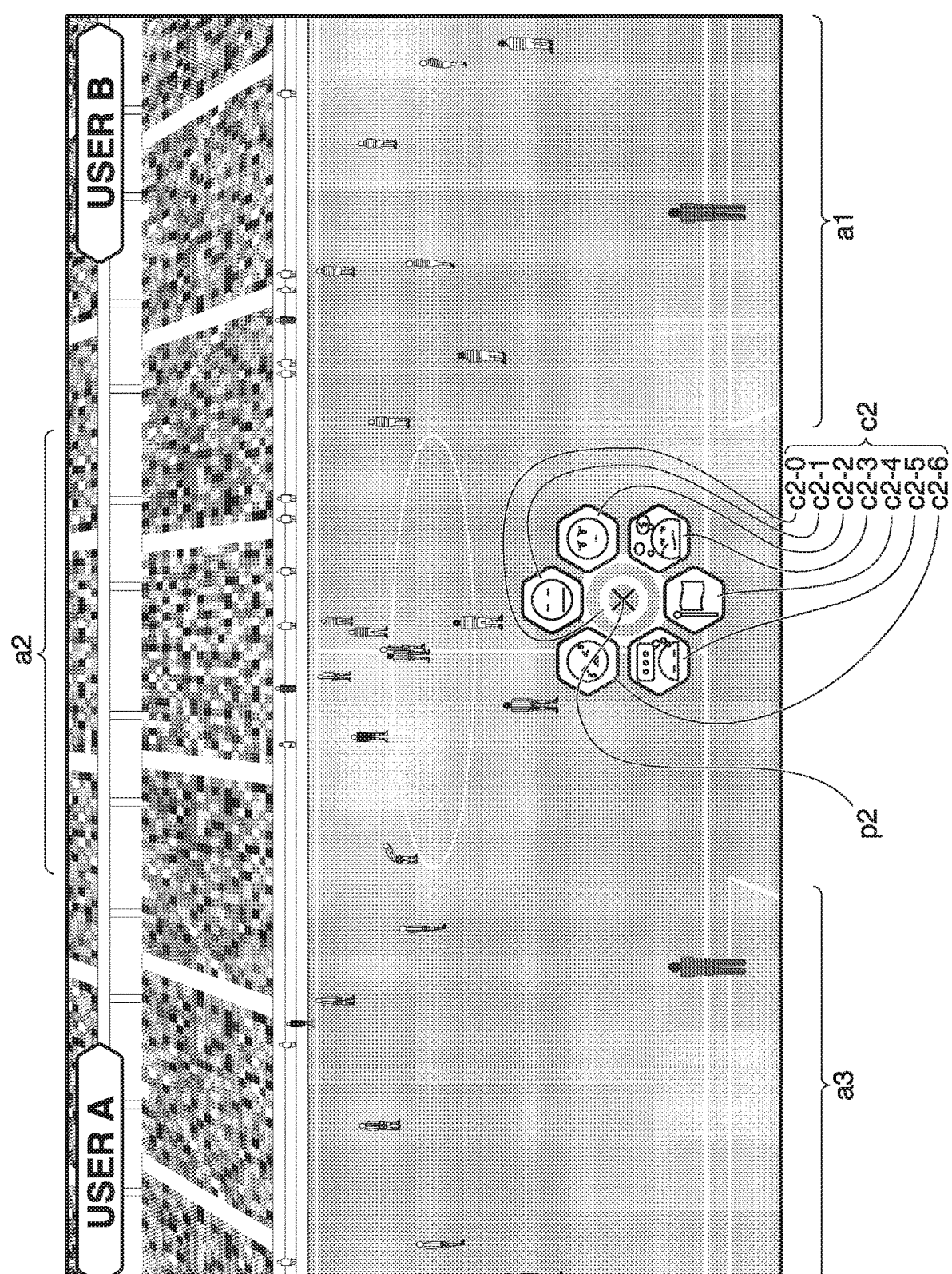
FIG. 6 is a view of an image displayed on the touch panel when an operation of touching a second area of the touch panel is detected in accordance with the first embodiment of the invention.

FIG. 6 shows an example of a screen in the case in which the touch panel 110 has detected a touch operation at the point p2 in the second partial area a2. In this case, the touch panel 110 displays the second operator c2 at the position of the point p2 in the second partial area a2. The second operation item c2 includes, centered on and surrounding the indicator c2-0 indicating the touch position at which the touch operation was made, a first selection item c2-1, a second selection item c2-2, a third selection item c2-3, a fourth selection item c2-4, a fifth selection item c2-5, and a sixth selection item c2-6. In this case, the touch panel 110 displays a second operator c2 that includes selection items that are different from those of the first operator c1 displayed in the case in which a touch operation is made in the first partial area a1. These pluralities of selection items are associated beforehand with each partial area. If the touch position at the second operation item c2 displayed by the touch panel 110 slides and then is no longer detected over one of the selection items, the operation system 100 accepts input of an operation instruction indicating selection of that selection item.

Figure 7:
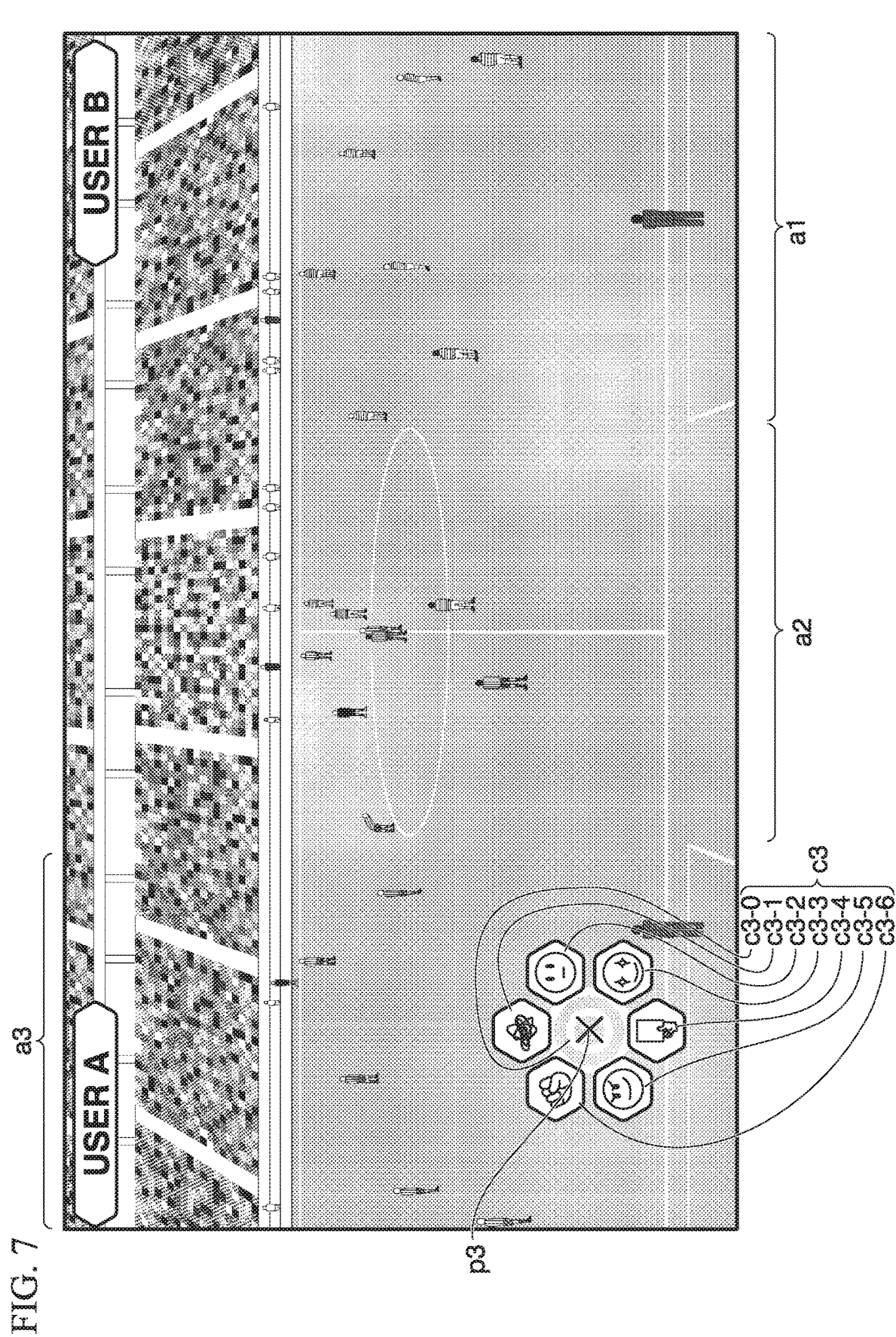
FIG. 7 is a view of an image displayed on the touch panel when an operation of touching a third area of the touch panel is detected in accordance with the first embodiment of the invention.

In the same manner, FIG. 7 shows a screen example of a case in which the touch panel 110 detects a touch operation made at the point p3 in the third partial area a3. In this case, the touch panel 110 displays the third operator c3 at the position of the point p3 in the third partial area a3. The third operation item c3 includes, centered on and surrounding the indicator c3-0 indicating the touch position at which the touch operation was made, a first selection item c3-1, a second selection item c3-2, a third selection item c3-3, a fourth selection item c3-4, a fifth selection item c3-5, and a sixth selection item c3-6. In this case, the touch panel 110 displays a third operator c3 that includes selection items that are different from those of the first operator c1 displayed when a touch operation is made in the first partial area a1 and the second operator c2 displayed when a touch operation is made in the second partial area a2. If the touch position at the third operation item c3 displayed by the touch panel 110 slides and is then no longer detected over one of the selection items, the operation system 100 accepts input of an operation instruction indicating selection of that selection item.

In this manner, the operation system 100 of the present embodiment divides the screen area of the touch panel 110 into a plurality of partial areas and, when a touch operation is made, displays at the touch position an operator that includes selection items in accordance with the partial area of the touch position at which the touch operation was made. In this manner, because the touch panel 110 displays an operator at the touch position when a touch operation has been made, it is possible to make effective use of a large area of the screen area, as an area other than the area of the operator, for example, for displaying images and the like operated by characters. Additionally, in this case, because the user is made to select the position at which the operator is to be displayed, the user, by making a touch operation in an area other than an area that the user him/herself wishes to pay attention to, can display and input an operation instruction at an arbitrary position that does not present interference. Also, because the operation system 100 displays an operator that includes a plurality of selection items pre-associated with a partial area in accordance with the partial area at which a touch operation was made, compared to the case in the same operator is displayed regardless of what position of the screen area a touch operation is made, it is possible to enable selection of a selection item from a greater number of selection items.

Figure 8:
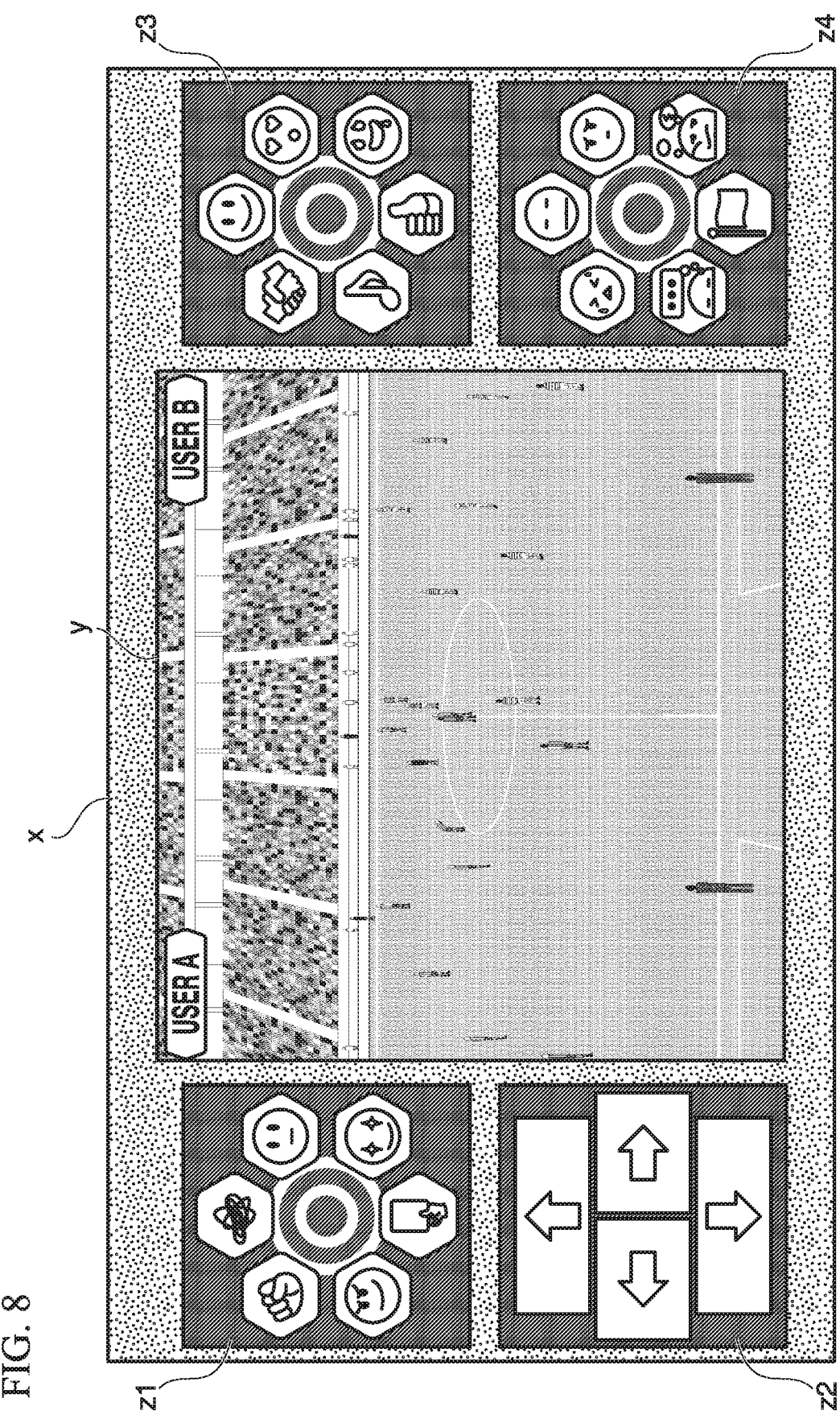
FIG. 8 is a view of an image displayed on the touch panel in a comparative example.

For example, FIG. 8 shows an example of a screen for the case in which the touch panel screen area is divided into rectangular area (game screen area) in the center of the screen, in which images operated by characters and the like are displayed, and areas there-surrounding (operator display areas) in which images such as virtual operators are displayed. In this example, the rectangular shaped game screen area y is displayed in the center of the screen area x, and the virtual operators z1, z2, z3, and z4 are displayed in the area there-surrounding. In this case, because a plurality of operators occupy the screen at all times, the area that can be reserved for the game screen area y is small. For example, the more selection items there are for an icon chat, the more area the operators occupy.

In contrast, if the display of operators is controlled as in the above-described present embodiment, it is possible, for example, to utilize the entire screen area as the game screen area. The operation system 100 that controls these kinds of operators will be described below in detail.

In FIG. 1, the storage 120 is constituted using a recording medium such as RAM (random-access memory), ROM (read-only memory), HDD (a hard-disk drive) or a combination thereof, and stores various programs and information for the purpose of controlling the various parts of the operation system 100. The storage 120 has a selection item storage 121 and an area information storage 122.

In FIG. 1, the selection item storage 121 stores information regarding the selection items that are included in the operators. FIG. 9 shows an example of data of selection items stored in the selection item storage 121. The selection item storage 121 stores, for each area ID (identifier), which is identification information identifying a partial area, the selection items associated with that partial area. In this case, the example shows associated icon images as the selection items. For example, with respect to the partial area having the area ID of a1, this example shows the icon images associated with the first selection item, the second selection item, the third selection item, the fourth selection item, the fifth selection item, and the sixth selection item.

Figure 11:
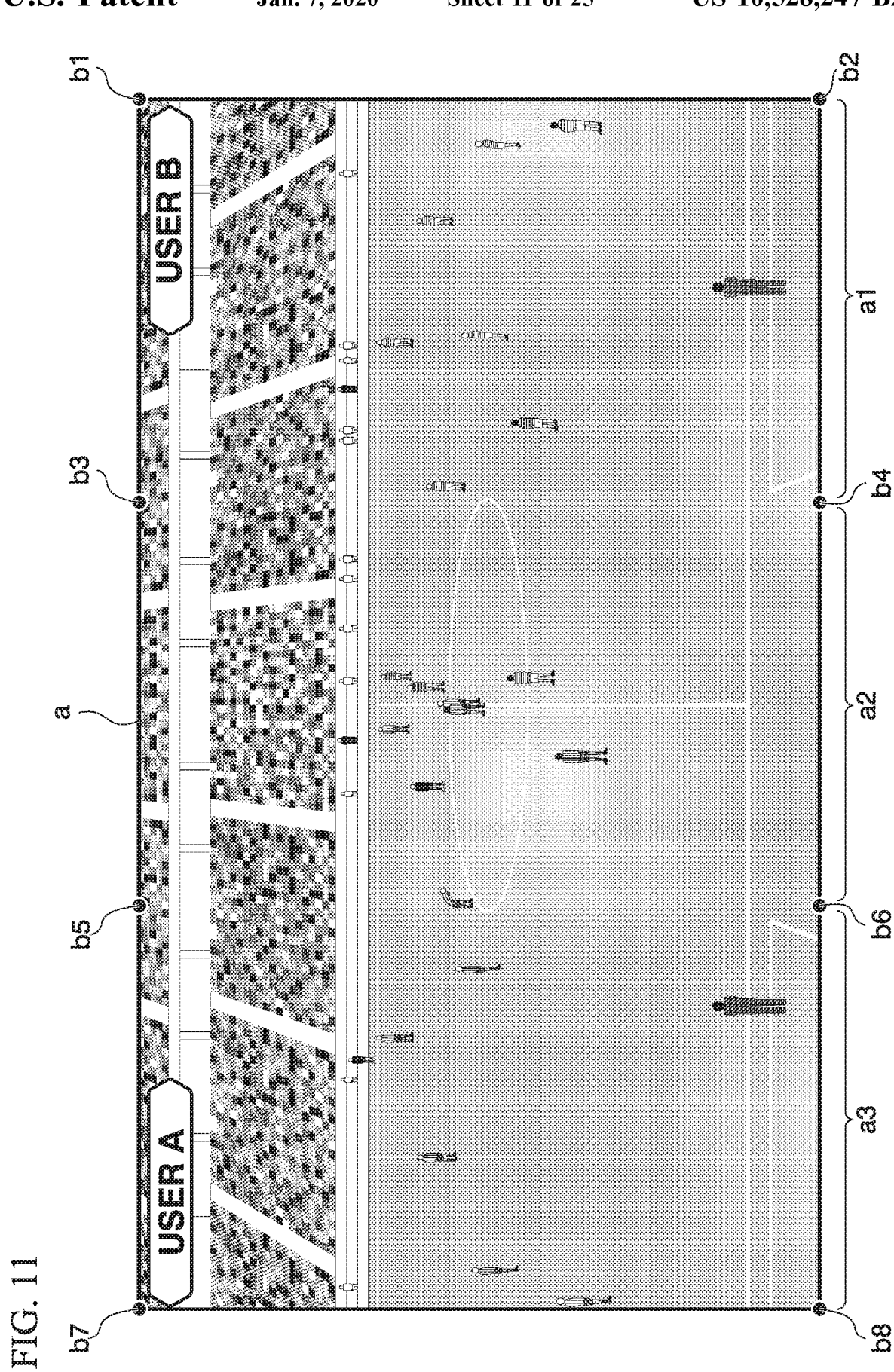
FIG. 11 is a view of an image with area ranges displayed on the touch pane in accordance with the first embodiment of the invention.

In FIG. 1, the area information storage 122 stores area information that establishes the range of the partial areas of the touch panel 110. FIG. 10 shows an example of data of the area information stored in the area information storage 122. In the area information, area range information indicating the range of a partial area of the screen area is associated with each area ID identifying the partial area. The area range information is, for example, information indicating the coordinates of four points that identify the partial area in the screen area. FIG. 11 shows a general view of the area range. For example, the first partial area a1 in the screen area a can be identified by the coordinate values of the four points b1, b2, b3, and b4. Given this, information representing the coordinate values of the x coordinate and the y coordinate of the positions of each of the four points in the screen area is stored in association as area range information. In the same manner, the second partial area a2 can be identified by the coordinate values of the four points b3, b4, b5, and b6 and, in the same manner, the third partial area a3 can be identified by the coordinate values of the four points b5, b6, b7, and b8.

Returning to FIG. 1, the controller 130 has an information processing device, such as a CPU (central processing unit), functioning as the control center of the operation system 100, which controls the various parts of the operation system 100. The controller 130 has a detector 131, an area identifier 132, a selection item identifier 133, and a display controller 134.

The detector 131 detects an operation with respect to an arbitrary position on the touch panel 110. For example, when a touch operation is made at an arbitrary position in the screen area of the touch panel 110, and an input signal indicating that the user's finger has made contact, the detector 131 generates information indicating the coordinate values of the x coordinate and the y coordinate of the touch position in the screen area. In this case, if the input signal from the touch panel 110 stops being generated instantaneously, the detector 131 make take this as the touch operation with respect to the touch panel 110 no longer being made or, in order to prevent faulty operation by instantaneous on/off operation caused by chattering, the detector 131 may perform chattering control so that, if the period of time during which the input signal by the touch panel 110 is no longer generated is instantaneous (that is, within a prescribed period of time), the touch operation is taken to be continuing and the touch operation is detected. In this case, if the input signal generated by the touch panel 110 is interrupted for at least a prescribed period of time, the detector 131 can take the touch operation is no longer being detected.

The area identifier 132 identifies a partial area of a plurality of prescribed areas of the touch panel 110 in which the position at which an operation is detected by the detector 131 is included. For example, the area identifier 132 identifies the area range information that includes the position indicated by the touch position generated by the detector 131, and reads out the area ID associated with the identified area range information.

The selection item identifier 133 identifies a plurality of selection items that are associated with a respective partial area of the plurality of partial areas. For example, the selection item identifier 133 reads a plurality of selection items stored in the selection item storage 121 in associated with the area ID read out by the area identifier 132.

The display controller 134 displays the operator in which the plurality of selection items identified by the selection item identifier 133 at the position on the touch panel 110 at which the touch operation was detected.

Figure 12:
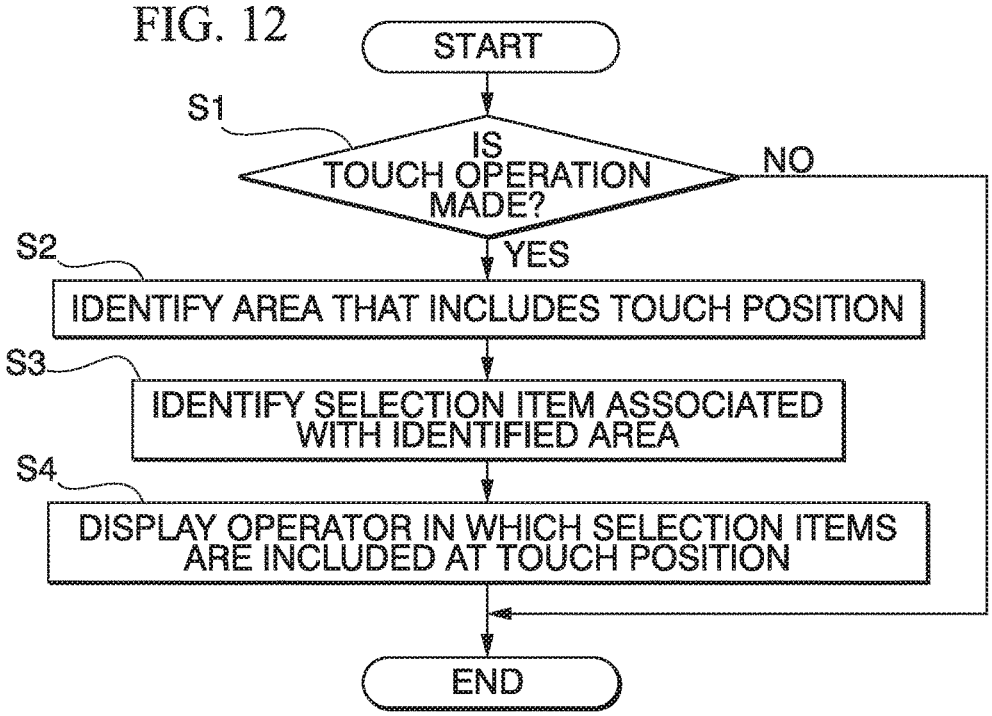
FIG. 12 is a flowchart of system operations of the operation system in accordance with the first embodiment of the invention.

Next, an example of the operation of the operation system 100 according to the present embodiment will be described, with references made to the drawings. FIG. 12 is a flowchart showing an example of the operation of the operation system 100 according to the present embodiment.

The controller 130 executes an application and displays an application screen on the touch panel 110. The detector 131 detects a touch operation with respect to the touch panel 110. If the detector 131 does not detect a touch operation with respect to the touch panel 110 (NO at step S1), processing is ended without displaying the operator.

If the detector 131 detects a touch operation with respect to the touch panel 110 (YES at step S1) and outputs information indicating the touch position, the area identifier 132 reads the area ID associated with the touch position from the area information storage 122 (step S2). The selection item identifier 133 reads out from the selection item storage 121 a plurality of selection item associated with the area ID read out by the area identifier 132 (step S3). The display controller 134 displays the operator in which the plurality of selection items read out by the selection item identifier 131 at the touch position on the touch panel 110 detected by the detector 131 at step S1 (step S4).

If this is done, for example, it is possible to display operators at arbitrary positions on the screen area, as required by the user, while utilizing the entire screen area of the touch panel 110 as an area for displaying images operated by characters or the like. This enables use of a wide-ranging area as an area for display of information other than operators, providing easy-to-view, rich expressions, without having a part of the screen area constantly occupied by operators. In addition, because an operator can be displayed and accept operation instruction input at a position that is easy for the user to operate and does not present interference, more intuitive operation is possible. Furthermore, because these operators can be displayed to include a plurality of selection items, the user can view the displayed selection items, thereby enabling verification of what types of selection items exist. Also, because operators including different selection items can be displayed depending upon the partial area of the screen area, more selection items can be presented to the user, enabling acceptance of the input of diverse operation instructions and broadening the range of selection by the user.

Although the present embodiment has shown an example in which the screen area is divided into three partial areas and controlled, there may be two or four or more partial areas. Also, although in the present embodiment the partial areas are shown as being divided by vertical lines, they may be divided by horizontal lines. Also, although in the present embodiment each of the partial areas are shown as being rectangular, the partial areas may be polygons such as triangles, circular, or elliptical. Also, although in the present embodiment the screen area is shown as being divided into partial areas with no gaps therebetween, there may be an area in which a touch operation does not cause display of an operator. For example, in the areas in which the labels u1 and u2 are displayed, it may be made so that a touch operation does not cause display of an operator and, in an area in which some other operator is always displayed, it may be made so that a touch operation does not cause display of an operator. That is, the operation system 100 may perform control so that, if the detector 131 detects an operation with respect to an arbitrary position at which an operator or the like is not displayed on the touch panel 110, an operator is displayed at that position. Alternatively, for example, the operation system 100 may be an arcade game machine or a computer that has a large display (touch panel 110) and, when it is envisioned that touch operations with respect to the upper part of the screen area will seldom be made, only the region at the lower part of the screen may be made a partial area in which operators are displayed in response to a touch operation.

Although the present embodiment was shown as an example in which the display of operators is controlled for the selection of selection item in an icon chat, in the case of an operator for displaying a plurality of selection items, the operator may be for another purpose. For example, the display of an operator for operating a character may be controlled as described above. Also, although in the above-described embodiment the example of the selection items being icon images was shown, the selection items may be characters, character strings, or information such as numerals. Also, although in the above-described embodiment one operator was shown as including six selection items, an arbitrary number of selection items may be included in an operator, in accordance with the size of the screen area, the size of the partial area, the ratio between the screen area size and the partial area size, and the content and size or the like of images and characters (or strings) displayed as selection item.

Second Embodiment

Next, the second embodiment of the present invention will be described. In the present embodiment, an example will be described, in which the operator display in response to a touch operation by the operation system 100 in the first embodiment is no longer displayed when the touch operation is no longer detected. The operation system 100 of the present embodiment has the same constitution as the operation system 100 shown in the first embodiment.

If the detector 131 stops detecting a touch operation within an area in which an operator is displayed on the touch panel 110, the display controller 134 of the present embodiment removes the display of the displayed operator. Cases in which within an area in which an operator is displayed on the touch panel 110 the detector 131 stops detecting a tough operation include cases in which the touch position slides and an input is accepted of an operation instruction that selected one selection item from among a plurality of selection items, and cases in which the touch operation is no longer detected, without selection of a selection item. Cases of no longer detecting a touch operation without selection of a selection item are, for example, one in which the touch operation is no longer detected in the area of the center index of the operator, one in which the judgment has been made that the slid touch position has moved beyond the area in which the selection items of the operator were displayed, and one in which the touch operation stops being detected after the slid touch position has moved beyond the area in which the selection items of the operator were displayed.

Figure 13:
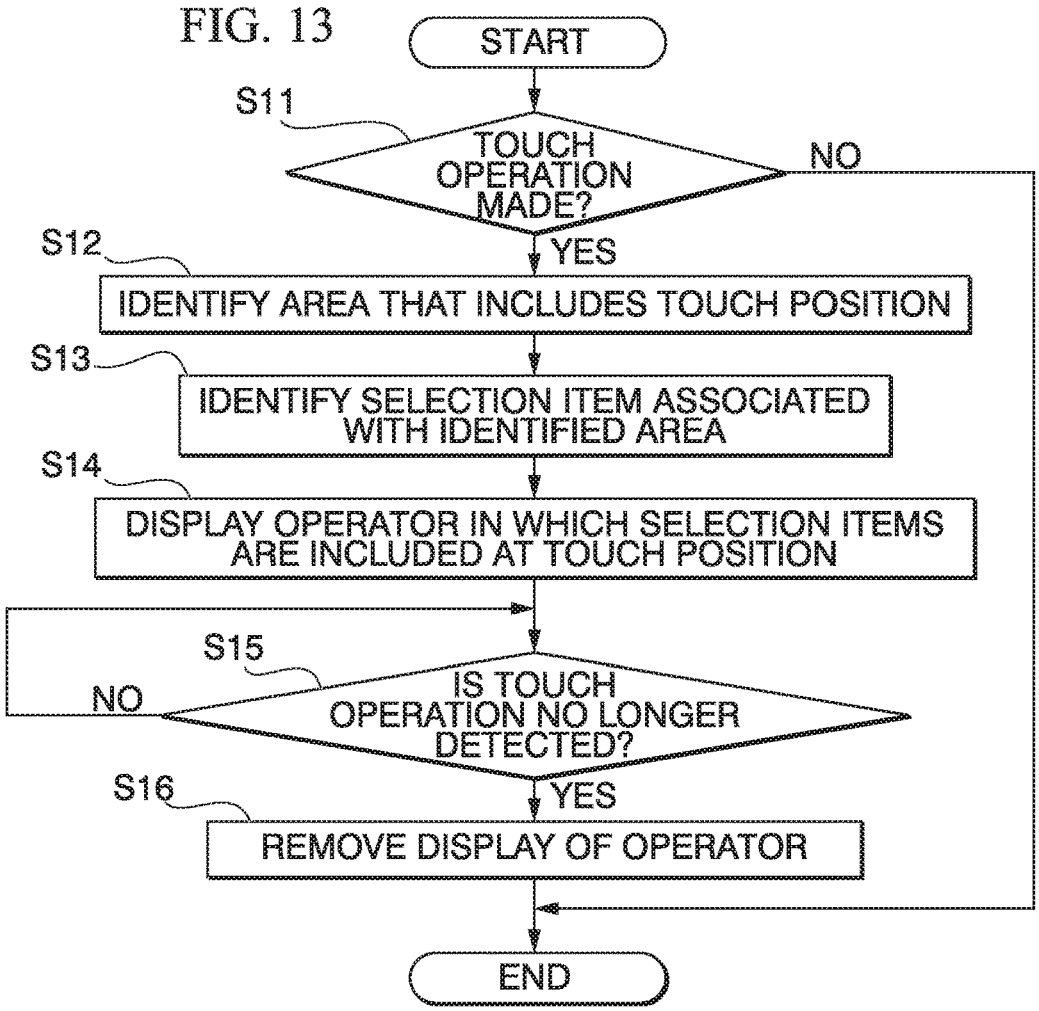
FIG. 13 is a flowchart of system operations of the operation system in accordance with a second embodiment of the invention.

An example of the operation of the operation system 100 according to the present embodiment will be described, with references made to the drawings. FIG. 13 is a flowchart showing an example of the operation of the operation system 100 according to the present embodiment.

Step S11 to step S14 are the same as the processing of step S1 to step S4 described in the first embodiment. For example, if the detector 131 detects a touch operation with respect to the touch panel 110 (YES at step S11) and outputs information indicating the touch position, the area identifier 132 reads the area ID associated with the touch position from the area information storage 122 (step S12). The selection item identifier 133 reads out from the selection item storage 121 a plurality of selection item associated with the area ID read out by the area identifier 132 (step S13). The display controller 134 displays at the touch position on the touch panel 110 detected by the detector 131 the operator in which the plurality of selection items read out by the selection item identifier 133 are included at step S11 (step S14). If the detector 131 continues to detect a touch operation within the area in which the operator is displayed on the touch panel 110 (NO at step S15), the processing of step S15 continues. If the detector 131 stops detecting a touch operation within the area in which the operator is displayed on the touch panel 110 (YES at step S15), the display controller 134 removes the display of the operator that was displayed at step S14.

By doing this, it is possible to display the operator only during the time in which the user is making a touch operation, and to remove the operator when the touch operation is no longer being made. This enables the user to display an operator at a position the user wishes to display the operator only during the time when the user wishes to display the operator, thereby enabling more intuitive operation. That is, the user can freely display an operator on the touch panel 110, verify what type of plurality of selection items are included in the displayed operator, think of which selection item thereof to select, and proceed to complete the selection operation with a timing that is the preference of the user, in accordance with the game situation or the like. For example, even if a user makes a touch operation in a partial area of the touch panel 110 to display an operator during a game, if the game situation means that the display of the operator presents interference, the user can release the finger that made the touch operation from the touch panel 110, even without making selection of a selection item, so as to remove the display of the operator.

Third Embodiment

Next, the third embodiment of the present invention will be described. The operation system 100 of the present embodiment displays a guide image that indicates the range of a partial area on the touch panel 110 that displays an operator in the first embodiment. The operation system 100 of the present embodiment has the same constitution as the operation system 100 shown in the first embodiment.

Figure 14:
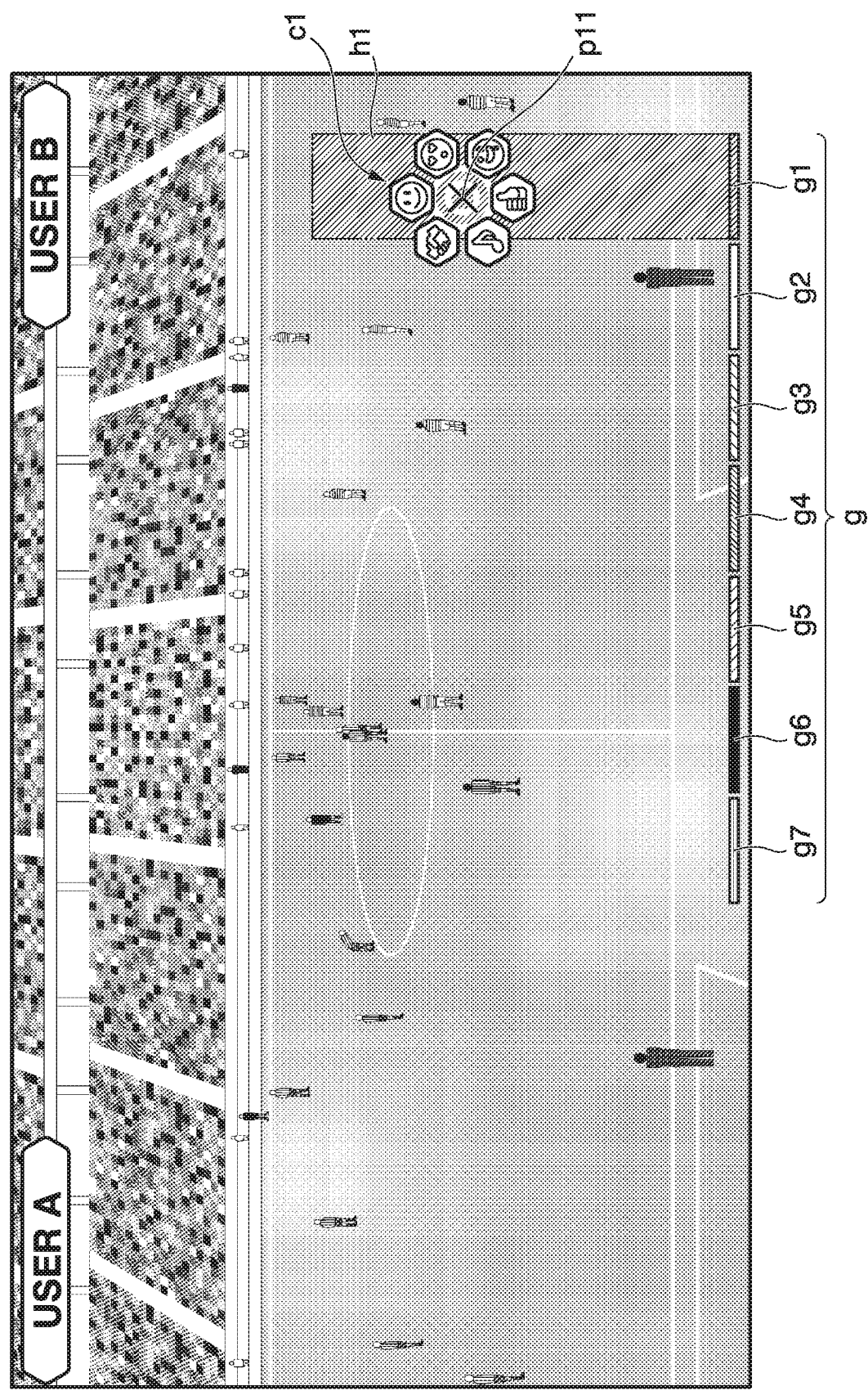
FIG. 14 is a view of a first image displayed on a touch panel when any operation of touching the touch panel is not detected in accordance with a third embodiment of the invention.

FIG. 14 shows an example of a first screen displayed by the touch panel 110 according to the present embodiment. This drawing shows an example in which seven partial areas are provided in a part of the screen area, and in which a guide image g that indicates the ranges of the partial areas has been displayed. In this manner, the display controller 134 of the present embodiment causes the display on the touch panel 110 of a guide image that shows the ranges of each of the plurality of partial areas on the touch panel 110. In this example, the guide image g, for each of the seven partial areas, displays the first guide image g1, the second guide image g2, the third guide image g3, the fourth guide image g4, the fifth guide image g5, the sixth guide image g6, and the seventh guide image g7. Each of the guide images indicates the horizontal width of a partial area that extends in the vertical direction on the screen area. For example, if a touch operation is made at the position of the point p11 in the partial area, the operation system 100 displays the first operator c1 at the touch position.

Figure 15:
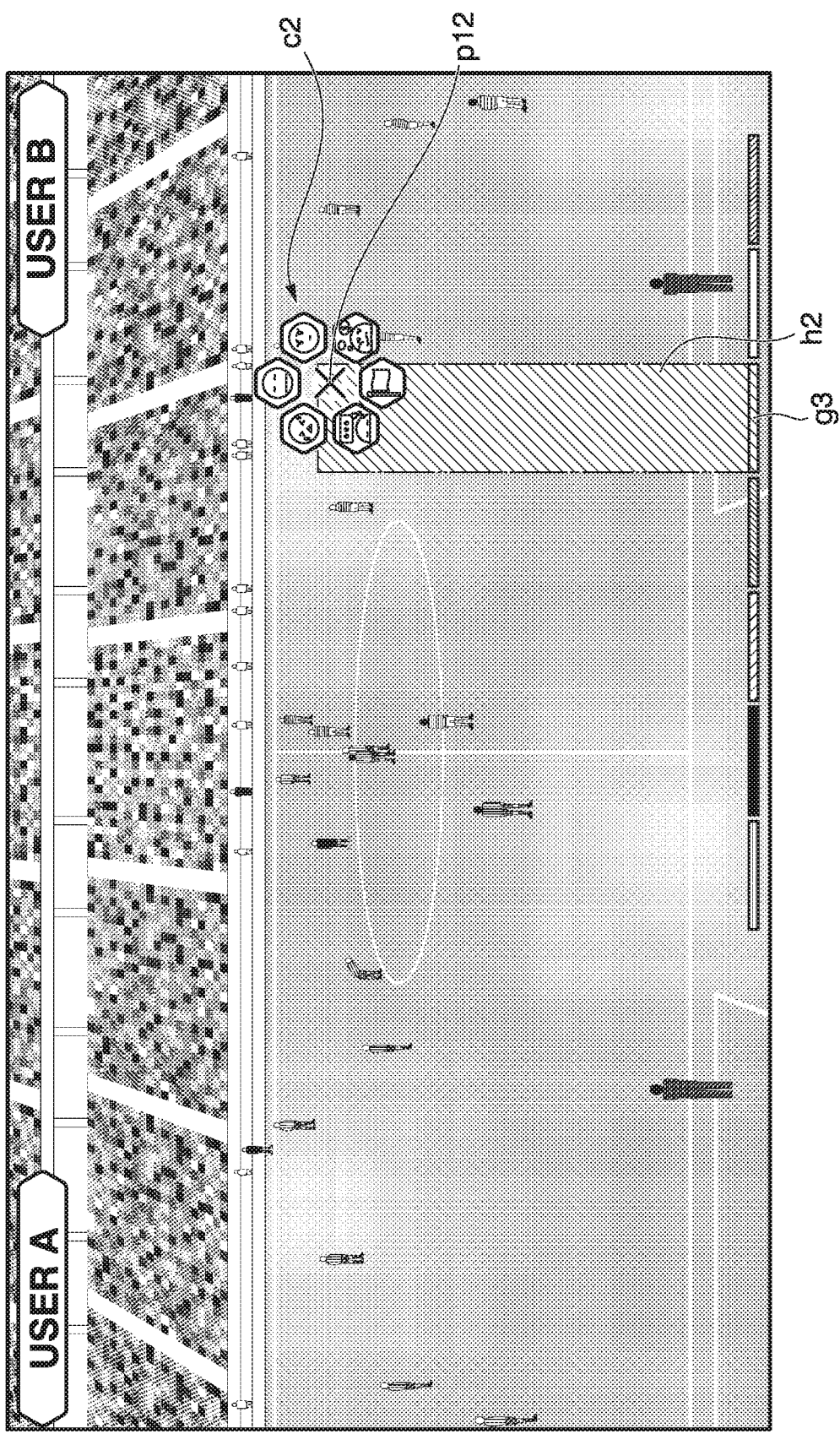
FIG. 15 is a view of a second image displayed on the touch panel when any operation of touching the touch panel is not detected in accordance with a third embodiment of the invention.

FIG. 15 shows an example of a second screen displayed by the touch panel 110 according to the present embodiment. In this case, the example shown is one in which a touch operation is made at the point p12 in the partial area indicated by the third guide image g3, and the second operator c2 is displayed at that touch position.

Figure 16:
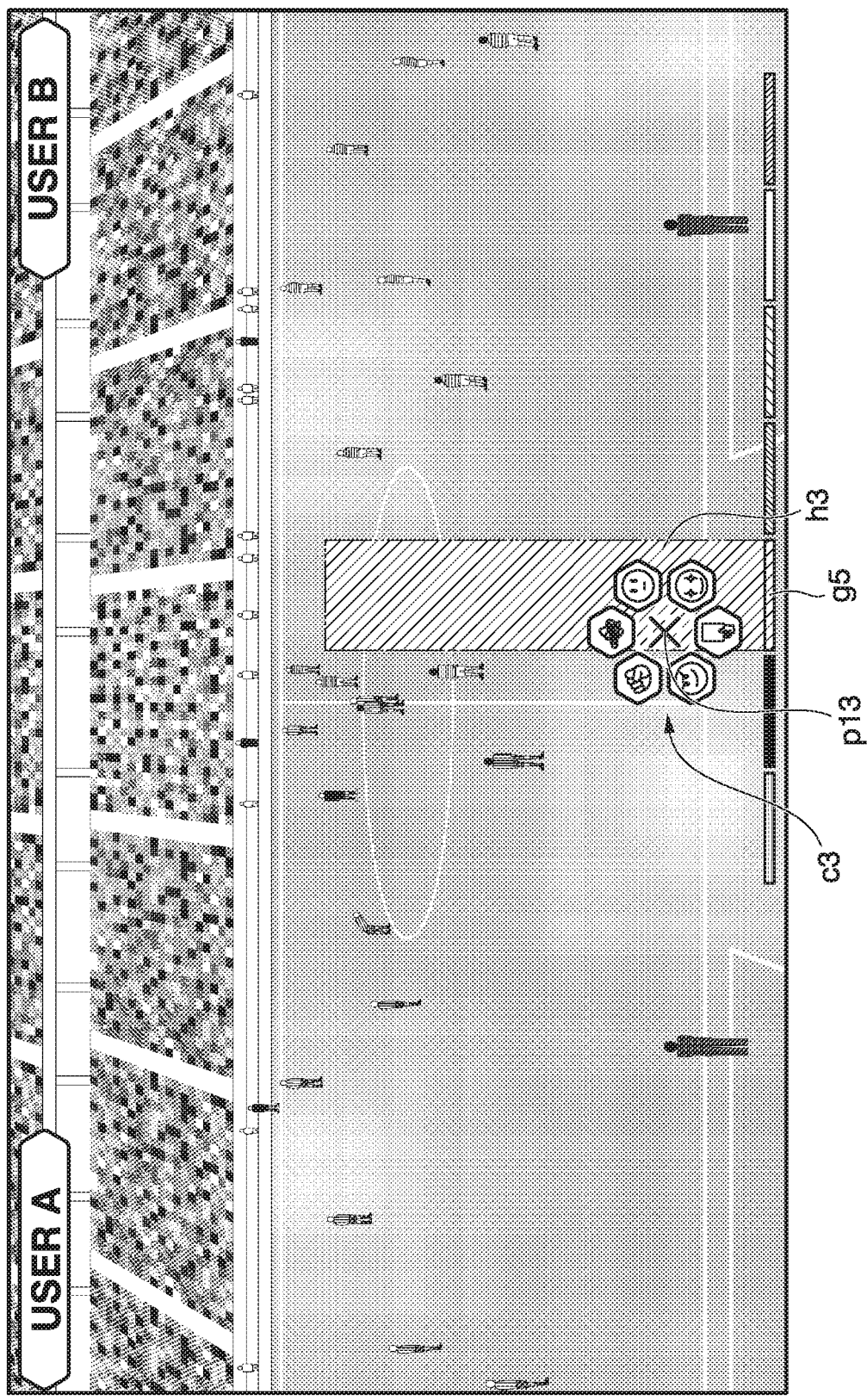
FIG. 16 is a view of a third image displayed on the touch panel when any operation of touching the touch panel is not detected in accordance with a third embodiment of the invention.

FIG. 16 shows an example of a third screen displayed by the touch panel 110 according to the present embodiment. This example shows the case in which a touch operation is made at the point p13 in the partial area indicated by the fifth guide image g5, and the third operator c3 is displayed at that touch position.

In the present embodiment, as shown in FIG. 14, FIG. 15, and FIG. 16, in addition to causing display of the first operator c1, the second operator c2, and the third operator c3 at the respective positions in which the touch operation is detected, emphasized displays h1, h2, and h3 are displayed directed upward from the guide images g1, g3, and g5, respectively, so as to indicate that the corresponding partial area has been selected.

By doing this, the user can know the range of a plurality of partial areas by viewing the guide images, and easily search for the operator that includes the selection items desired by the user. The emphasized displays make it easier for the user to recognize the partial area that the user has selected. In the present embodiment, the arrangement is that, even if a touch operation is made above the upper end of the emphasized display in the vertical direction, as long as it is within the range of one of the guide images g1 to g7 in the horizontal direction, the operator associated with each area can be displayed.

In this case, the plurality of selection items included in an operator can include item images color-coded for each partial area associated with the plurality of selection items, with the guide images color-coded in accordance with the item images. For example, icon images of selection items that are color-coded by partial area are stored into the selection item storage 121. The display controller 134 displays on the touch panel 110 the guide images of the partial areas in accordance with the colors of the icon images For example, selection items that are pink icon images are stored into the selection item storage 121 in association with the area ID of the partial area indicated by the first guide image g1. The display controller 134 displays on the touch panel 110 a pink first guide image g1. If a touch operation is made in the partial area indicated by the first guide image g1, the area identifier 132 identifies the area ID of the partial area that includes the position of the touch operation, and the selection item identifier 133 reads the pink icon images stored in the selection item storage 121 associated with the area ID of the partial area that includes the touch operation. The display controller 134 displays at the touch operation of the touch panel 110 the first operator c1 that includes the read-out pink icon images as selection items.

In the same manner, for example, selection items that are yellow icon images are stored into the selection item storage 121 in association with the area ID of the partial area indicated by the third guide image g3. The display controller 134 displays the third guide image g3 in yellow, and if a touch operation is made in the partial area indicated by the third guide image g3, the second operator c2, which includes yellow icon images as selection items, is displayed at the touch position on the touch panel 110.

In the same manner, for example, selection items that are blue icon images are stored into the selection item storage 121 in association with the area ID of the partial area indicated by the fifth guide image g5. The display controller 134 displays the fifth guide image g5 in blue, and if a touch operation is made in the partial area indicated by the fifth guide image g5, the third operator c3, which includes blue icon images as selection items, is displayed at the touch position on the touch panel 110.

By doing this, a user, by viewing the color-coded guide images, can easily recognize the ranges of partial areas that display different operators. Because when a touch operation is made in a partial area it is possible for the user to recognize the displayed selection items in association with the colors thereof, it is easy to remember what types of selection items are displayed when touch operations are made on specific partial areas. In this case, for example, by making the color of an icon a color that is related to a feeling that calls to mind a user emotion or message expressed by the icons, it is easier for the user to recognize the selection items. For example, pink can be used for an icon representing a friendly emotion or message with respect to the opponent, blue can be used for an icon expressing sadness, and red can be used for an icon expressing anger with respect to the opponent, so as to express a range of emotions, thereby facilitating recognition by the user.

Fourth Embodiment

Figure 17:
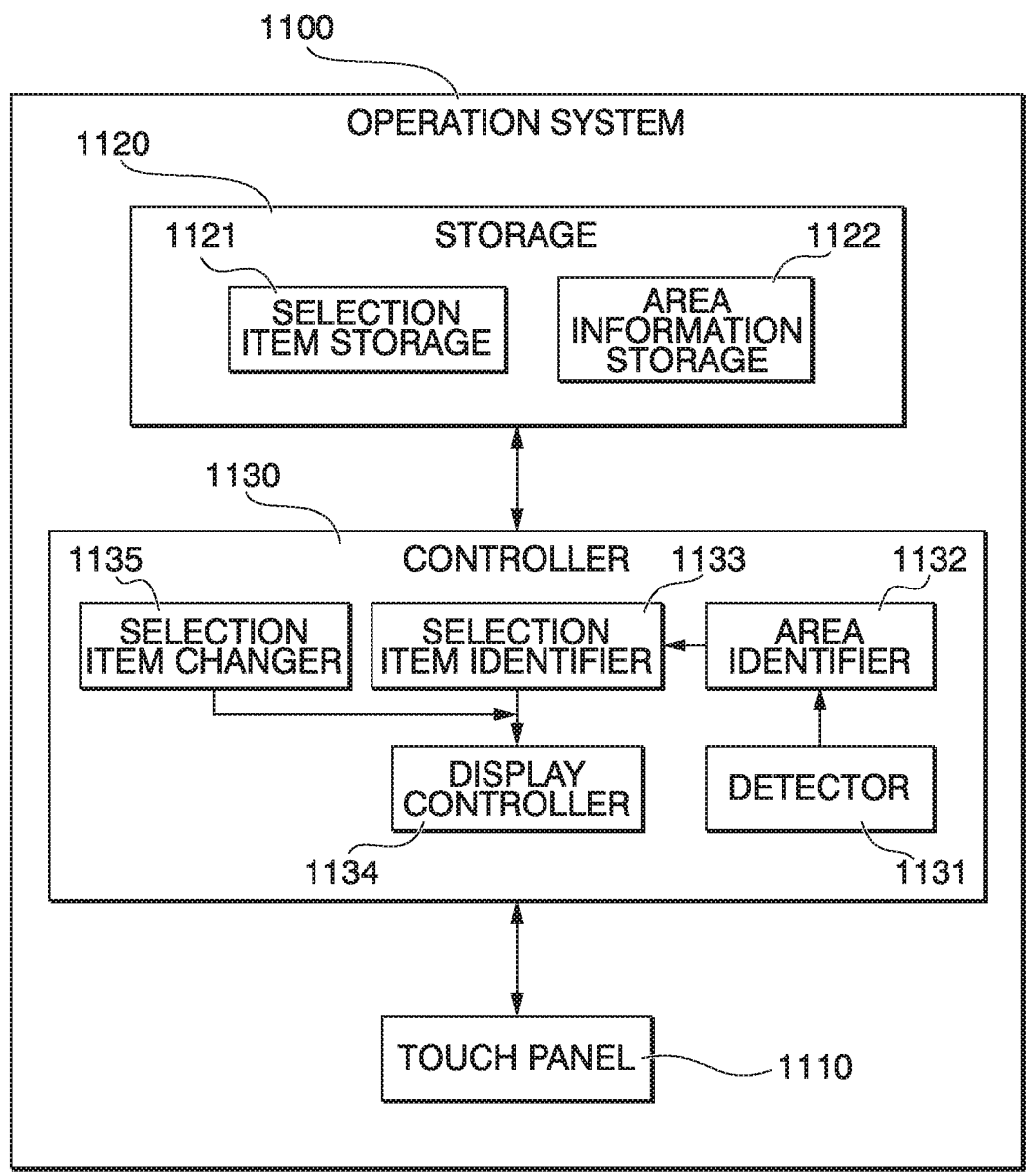
FIG. 17 is a block diagram illustrating an internal configuration of an operation system in accordance with a fourth embodiment of the invention.

Next, the fourth embodiment of the present invention will be described. FIG. 17 is a block diagram showing the constitution of an operation system 1100 according to the present embodiment. The operation system 1100 has a touch panel 1110, a storage 1120, and a controller 1130. The operation system 1100 is a computer, similar to the operation system 100 in the first embodiment, and the touch panel 1110, the storage 1120, and the controller 1130 have the same constitutions as the touch panel 110, the storage 120, and the controller 130 in the first embodiment. The characteristic points of the present embodiment will be described below.

Figure 18:
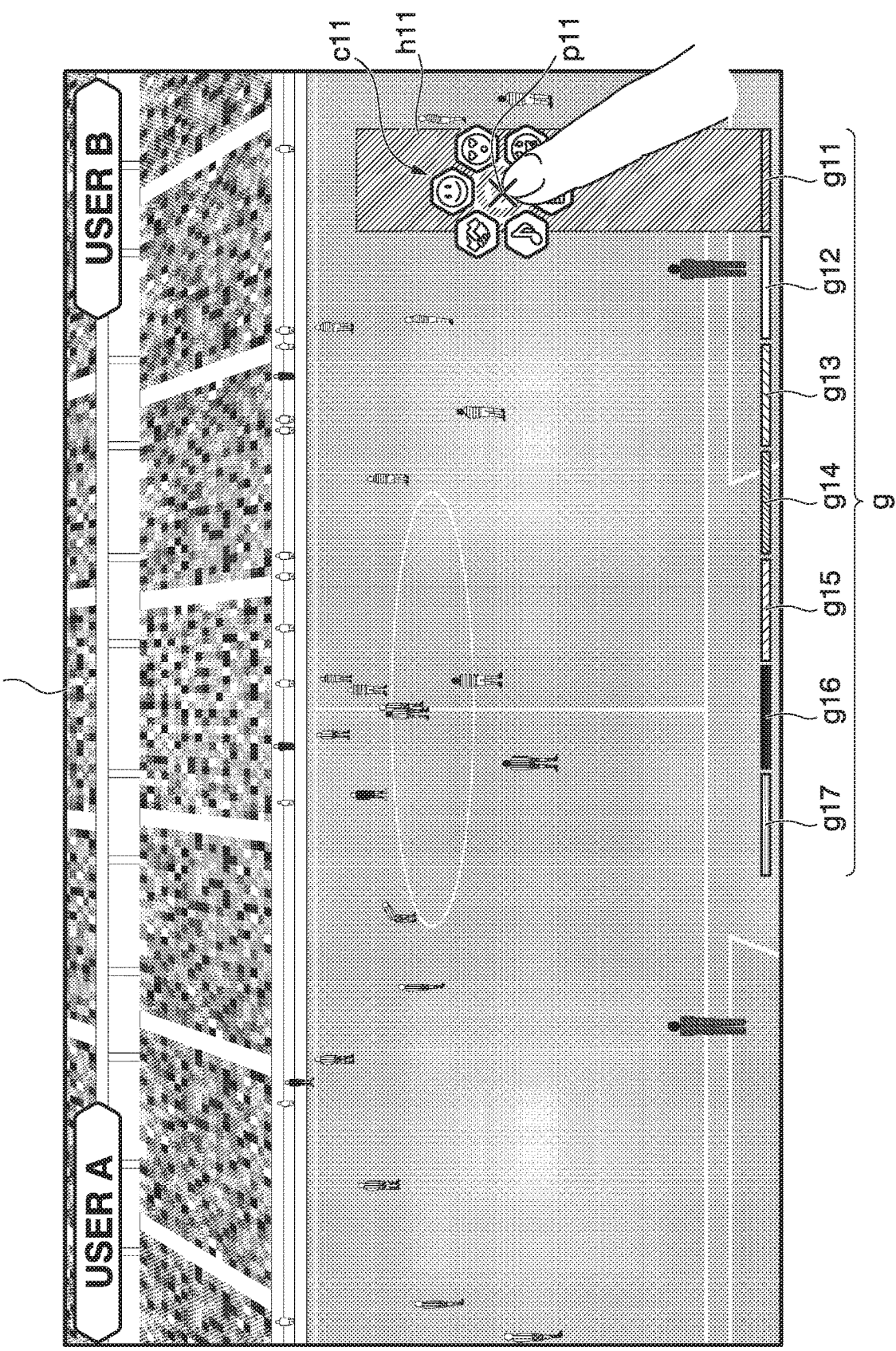
FIG. 18 is a view of a first image displayed on a touch panel when any operation of touching the touch panel is not detected in accordance with the fourth embodiment of the invention.

FIG. 18 shows an example of a first screen displayed by the touch panel 1110 according to the present embodiment. In the present embodiment, the display of operators is controlled in the screen area a, which is divided into a first partial area a11, a second partial area a12, a third partial area a13, a fourth partial area a14, a fifth partial area a15, a sixth partial area a16, and a seventh partial area a17. This drawing shows an example in which a guide image g that indicates the range of each of the seven partial areas provided in screen area is displayed. In this example, the guide image g displays, for each of the seven partial areas, the first guide image g11, the second guide image g12, the third guide image g13, the fourth guide image g14, the fifth guide image g15, the sixth guide image g16, and the seventh guide image g17. For example, when a touch operation is made at the position of the point p11 in the screen area, the operation system 1100 displays the first operator c11 at the touch position. An emphasized display h11 is displayed directly upward from the first guide image g11 to indicate the partial area that displayed the first operator c11.

Figure 19:
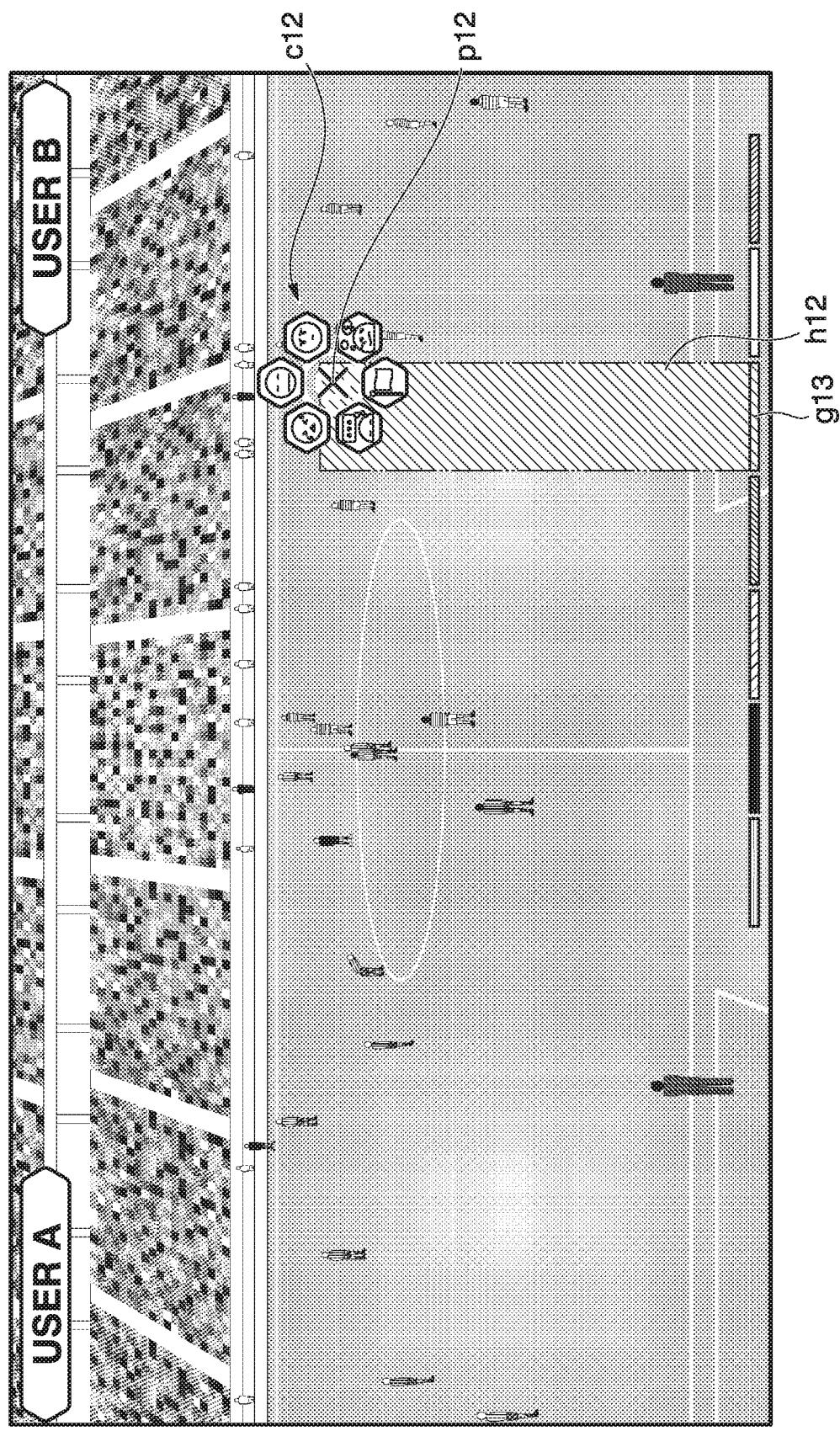
FIG. 19 is a view of a second image displayed on a touch panel when any operation of touching the touch panel is not detected in accordance with the fourth embodiment of the invention.

FIG. 19 shows an example of a second screen displayed by the touch panel 1110 according to the present embodiment. This example shows the case in which, if a touch operation is made at the point p12 in the partial area indicated by the third guide image g13, the second operator c12 is displayed at that touch position.

An emphasized display h12 is displayed directly upward from the third guide image g13 to indicate the partial area that displayed the second operator c12. In this case, the selection items included in the second operator c12 are different from those of the first operator c11. These pluralities of selection items are established and associated beforehand with each partial area.

Figure 20:
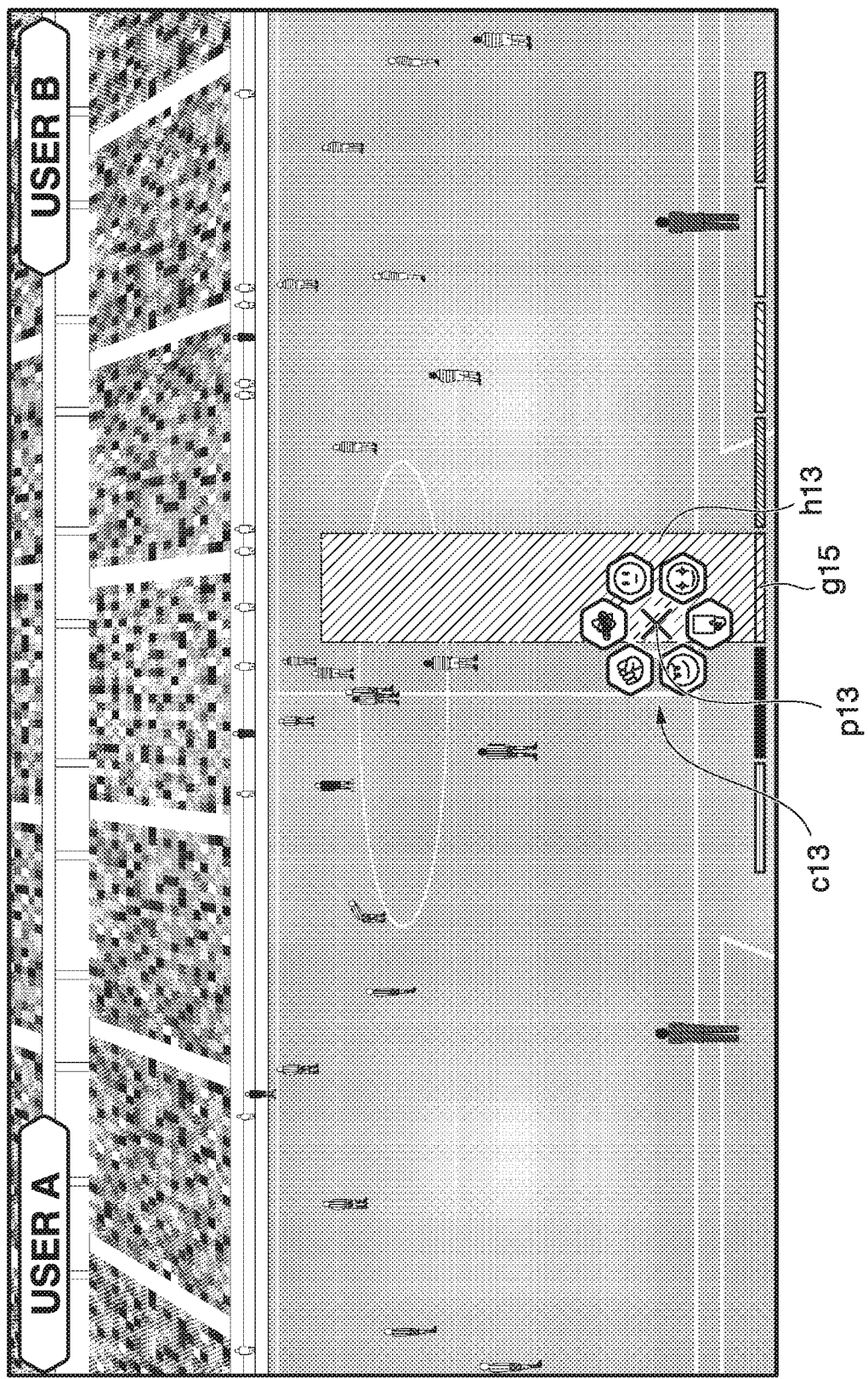
FIG. 20 is a view of a third image displayed on a touch panel when any operation of touching the touch panel is not detected in accordance with the fourth embodiment of the invention.

FIG. 20 shows an example of a third screen displayed by the touch panel 1110 according to the present embodiment. This example shows the case in which, if a touch operation is made at the point p13 in the partial area indicated by the fifth guide image g15, the third operator c13 is displayed at that touch position.

An emphasized display h13 is displayed directly upward from the fifth guide image g15 to indicate the partial area that displayed the third operator c13. In this case, the selection items included in the third operator c13 are different from those of the first operator c11 and the second operator c12.

Figure 21:
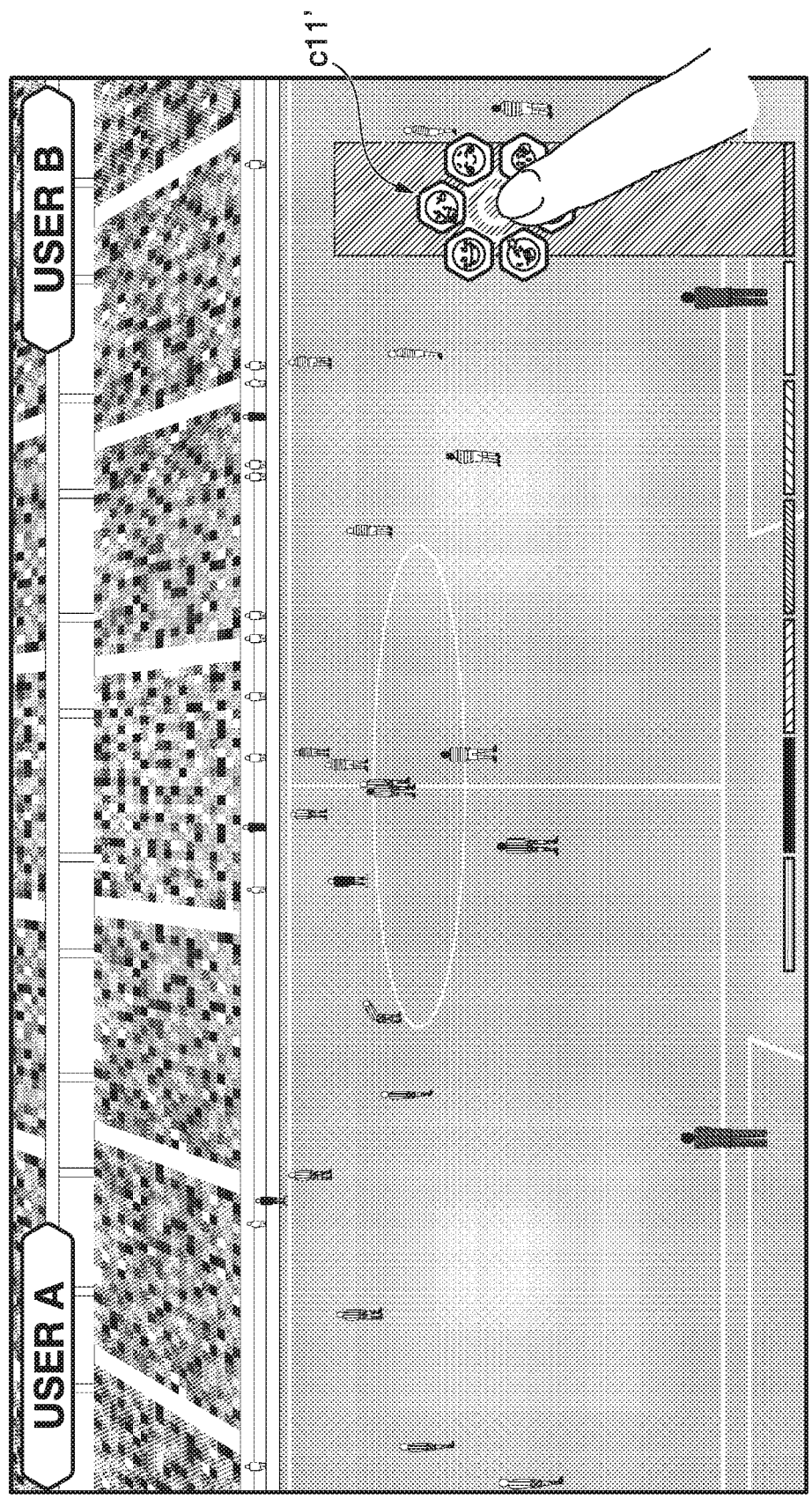
FIG. 21 is a view of a third image displayed on a touch panel when an operation of touching the touch panel has been continuously detected over a period of time in accordance with the fourth embodiment of the invention.

FIG. 21 shows an example of a screen when a touch operation has been detected at the point p11 for a time exceeding a certain time. If a touch operation is detected on the touch panel 1110 for a time exceeding a certain amount of time (for example, 3 seconds), the operation system 1100 displays an operator c11' in which the plurality of selection items included in the operator c11 are changed to other selection items. In this manner, because the operation system 1100 changes the selection items included in an operator when a touch operation is made for longer than a certain amount of time, compared to the case in which, once an operator is displayed, the display of the operator is continued without changing the selection item, it is possible to enable selection of a selection item from a greater number of selection items. In this case, the description is for the case in which all of the selection items included in the operator are changed to other selection items, an arbitrary part of the selection items may be changed to other selection items.

In addition to changing the selection items by continuing a touch operation for longer than a certain amount of time in the same touch position, this enables display of different selection items for each of the partial areas.

That is, it is possible to present to the user a number of selection items that is the number different selection items for each partial area multiplied by the number of selection item displayed that are changed by a long pressing. This enables display of a large number of selection items, while making efficient utilization of the screen area. The constitution of an operation system 1100 performing such control will be described below.

Returning to FIG. 17, the storage 1120 has a selection item storage 1121 and an area information storage 1122.

The selection item storage 1121 stores information regarding selection items to be included in operators. FIG. 22 shows an example of the data of selection items stored in the selection item storage 1121. The selection item storage 1121 stores, for each area ID, which is identification information that identifies partial areas, a plurality of selection item associated with those areas. For example, with respect to the partial area for which the area ID is all, the example shows the icon images of the associated first to the twelfth selection items.

Figure 24:
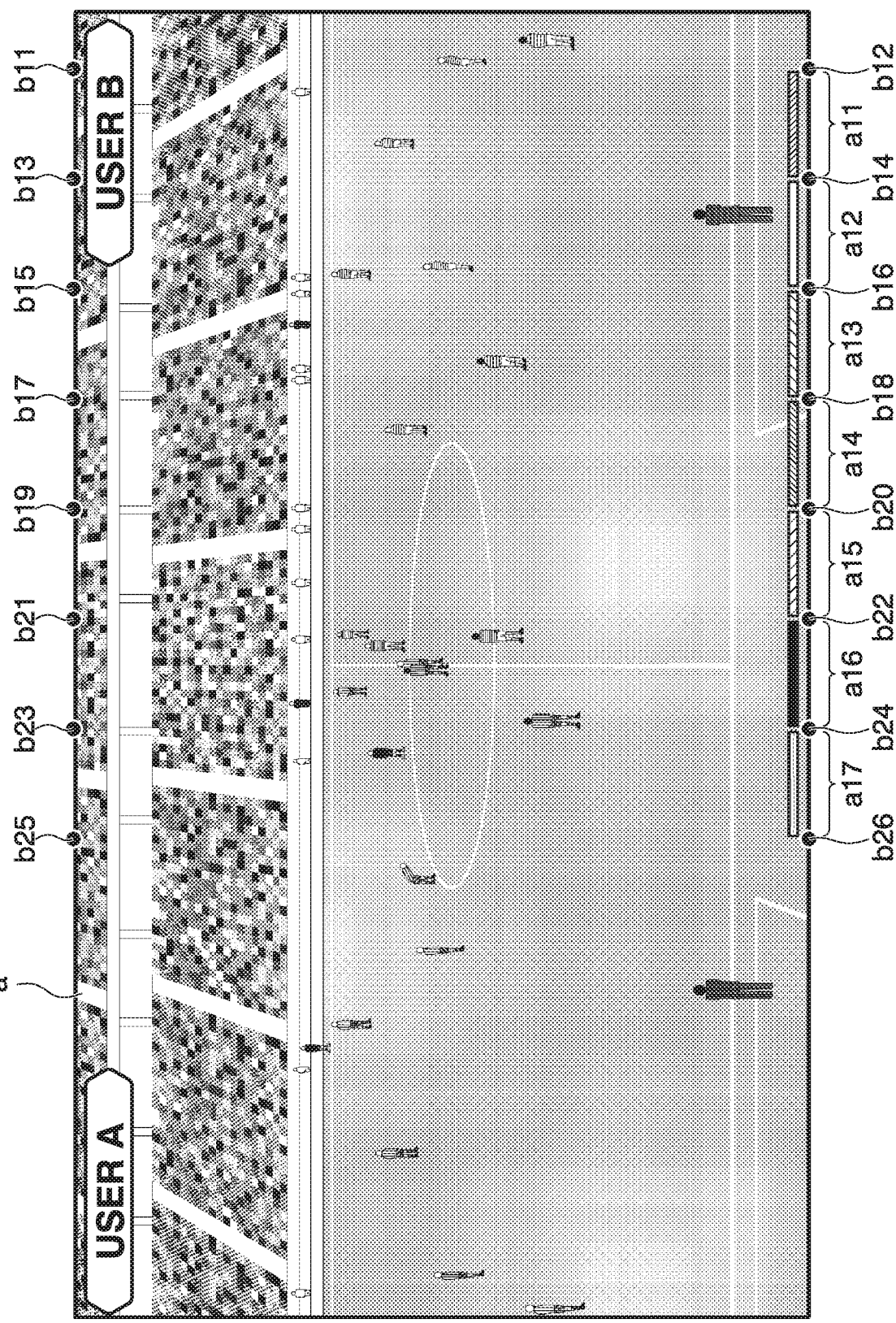
FIG. 24 is a view of an image with area ranges displayed on the touch pane in accordance with the fourth embodiment of the invention.

The area information storage 1122 stores area information that establishes the ranges of partial areas in the touch panel 1110. FIG. 23 shows an example of the data of the area information stored in the area information storage 1122. The area information includes, for each area ID that identifies a partial area, associated area range information indicating the range of that partial area in the screen area. The area range information is, for example, information indicating the coordinates of four points that identify the partial area in the screen area. FIG. 24 shows a general view of the area ranges. For example, the first partial area a11 in the screen area a can be identified by the coordinate values of four points, these being the coordinate values of the point b11, the coordinate values of the point b12, the coordinate values of the point b13, and the coordinate values of the point b14. In the same manner, second partial area a12 can be identified by the coordinate values of four points, these being the coordinate values of the point b13, the coordinate values of the point b14, the coordinate values of the point b15, and the coordinate values of the point b16.

Returning to FIG. 17, the controller 1130 has a detector 1131, an area identifier 1132, a selection item identifier 1133, a display controller 1134, and a selection item changer 1135.

The detector 1131, the area identifier 1132, the selection item identifier 1133, and the display controller 1134 have constitutions that are the same as the detector 131, the area identifier 132, the selection item identifier 133, and the display controller 134 in the first embodiment.

If the detector 1131 detects a touch operation continuously for a certain period of time, the selection item changer 1135 changes the plurality of selection items included in the operator displayed on the touch panel 1110 by the display controller 1134 to another plurality of selection items. The "case in which a touch operation is detected continuously for a certain period of time" may be a case in which, after having performed the above-described chattering control, a touch operation is detected continuously for a certain period of time. Also, the "case in which a touch operation is detected continuously for a certain period of time" may be a case in which the touch operation is detected continuously for a certain period of time while the touch position remains stationary (not moving), a case in which the touch operation is detected continuously for a certain period of time within a prescribed range (for example, within the display area of an operator), or the case in which the touch position has moved beyond a prescribed range (for example the display area of an operator) but the touch operation is detected continuously at some position on the touch panel 1110 for a certain period of time. For example, in the condition in which an operator including the first to the sixth selection items is displayed on the touch panel 1110, if the detector 1131 detects a touch operation continuously for a certain period of time, the selection item changer 1135 reads out the seventh to the twelfth selection items stored in the selection item storage 1121. The display controller 1134 changes the selection items included in the operator that was displayed on the touch panel 1110 to the selection items read out by the selection item changer 1135 to be displayed. In this case, for example, from the point in time of detection of the touch operation by the detector 1131, the selection item changer 1135 starts processing to measure the elapsed time and performs timer processing that continues the measurement of the elapsed time during the continuous detection of the touch operation. Then, when the elapsed time exceeds a certain period of time, it performs processing to change the selection items. In this case, the timer is reset at the point at which the processing to change the selection items is performed, at which point the measurement of the elapsed time is started anew and, if the certain period of time elapses again, the change processing is performed again. If the touch operation is no longer detected, the processing to measure the elapsed time is ended. Alternatively, for example, the selection item changer 1135 stores the time at which a touch operation was detected as the starting time and, during the time in which the touch operation is continuously detected, continues to calculate the difference between the starting time and the current time. Then, when the difference exceeds the certain period of time, processing to change the selection items is performed. In this case as well, for example, the time of performing the selection item changing processing is re-stored as the starting time and, by calculating the difference between that starting time and the current time, if the certain period of time elapses again, the changing processing is performed again.

In the present embodiment, after the display controller 1134 has displayed an operator on the touch panel 1110, when the touch operation on the touch panel 1110 is no longer detected by the detector 1131, and the display controller 1134 removes the display of the operator, the controller 1130 stores the plurality of selection items that had been displayed on the touch panel 1110 at that point into the storage 1120. When the detector 1131 again detects a touch operation, the selection item identifier 1133 reads out a plurality of selection items stored at the previous time into the storage 1120 and displays on the touch panel 1110 an operator in which the read-out plurality of selection items are included.

Next, an example of the operation of the operation system 1100 according to the present embodiment will be described, with references made to the drawings.

Figure 25:
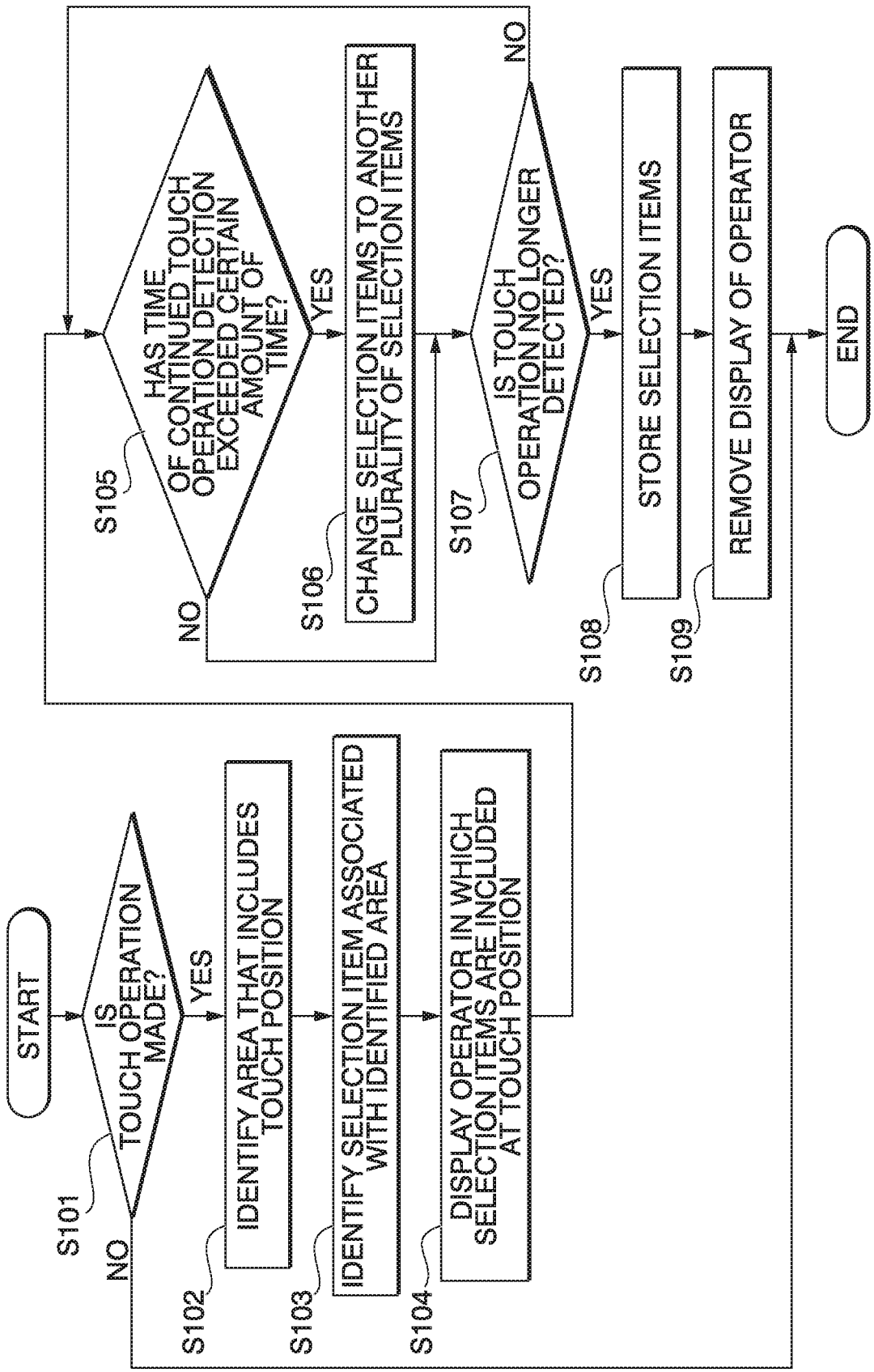
FIG. 25 is a flowchart of system operations of the operation system in accordance with the fourth embodiment of the invention.

FIG. 25 is a flowchart showing an example of the operation of the operation system 1100 according to the present embodiment.

The controller 1130 executes an application and displays an application screen on the touch panel 1110. The detector 1131 detects a touch operation made with respect to the touch panel 1110. If the detector 1131 has not detected a touch operation with respect to the touch panel 1110 (NO at step S101), the processing is ended without displaying an operator.

If the display controller 1131 has detected a touch operation with respect to the touch panel 1110 (YES at step S101) and information indicating the touch position is output, the area identifier 1132 reads out the area ID associated with the touch position from the area information storage 1122 (step S102). The selection item identifier 1133 reads out from the selection item storage 1121 a prescribed number of selection items associated with the area ID read out by the area identifier 1132 (step S103). In this case, if a plurality of selection item were stored at the previous time into the storage 1120, the selection item identifier 1133 displays on the touch panel 1110 an operator in which those plurality of selection items are included. The display controller 1134 displays an operator in which the plurality of selection items read out by the selection item identifier 1133 are included, at the touch position on the touch panel 1110 detected by the detector 1131 at step S101 (step S104).

If the amount of time that the touch operation continuously detected by the detector 1131 at step S101 does not exceed the certain period of time (NO at step S105), processing proceeds to step S107. If the amount of time that the touch operation continuously detected by the detector 1131 at step S101 exceeds the certain period of time (YES at step S105), the selection item changer 1135 reads out from the selection item storage 1121 selection items associated with the area ID identified at step S102 that are different from the plurality of selection items that were displayed on the touch panel 1110 at step S104. The display controller 1134 changes the plurality selection items included in the operator displayed on the touch panel 1110 at step S104 to the plurality of selection items read out by the selection item changer 1135 and displays these (step S106).

If the detector 1131 detects a touch operation on the touch panel 1110 continuously (NO at step S107) processing returns to step S105. If the detector 1131 stops detecting a touch operation on the touch panel 1110 (YES at step S107), the controller 1130 stores into the storage 1120 the plurality of selection items that had been display on the touch panel 1110 at that point in time (step S108). The display controller 1134 removes the display of the operator that was displayed at step S104 (step S109).

As described above, according to the present embodiment, it is possible to cause selection of a greater number of selection items and improve ease of operation, while making effective use of the screen area.

Although in the above-described examples, the example of controlling operators in a soccer game application has been described, other use is possible in, for example, action games such as a baseball, basketball, or shooting games and the like, in which applications characters are operated over a wide range on a screen and also real-time operation instruction input is made in response to the movement of characters or the like.

Other Embodiments

The various constituent elements of the operation system 100 and operation system 1100 in the above-described embodiments can be distributed among an arbitrary number of computers or disposed in a centralized manner, in accordance with a cloud environment or network environment, the scale in terms of number of users, the content of the application, and the number and specifications of hardware available to constitute the operation system 100 or touch panel 1100.

Figure 26:
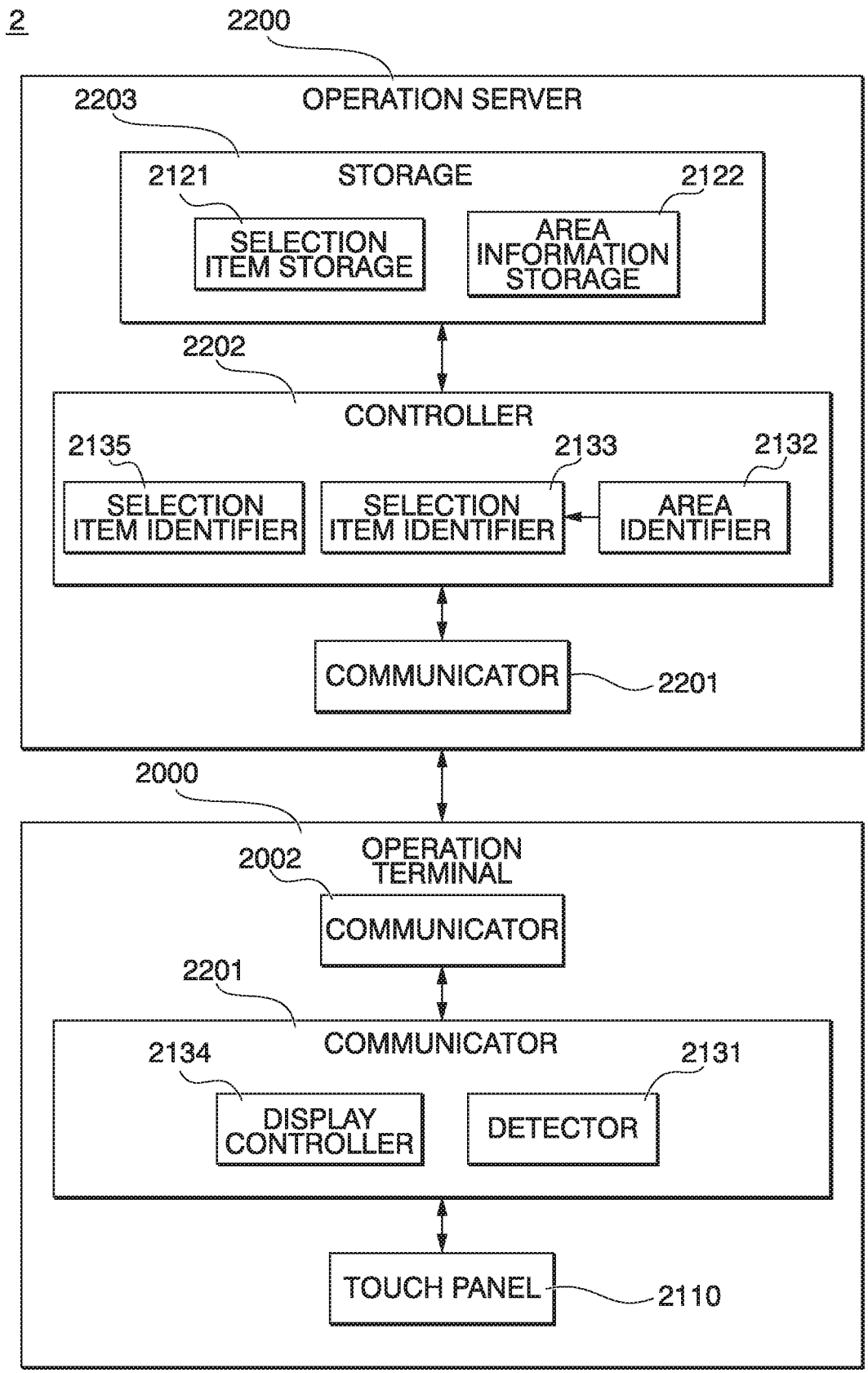
FIG. 26 is a block diagram illustrating an internal configuration of an operation system in accordance with other embodiments of the invention.

For example, FIG. 26 is a block diagram showing a variation example of the operation system. In this case, an operation system 2 has an operation terminal 2000 operated by user and an operation server 2200 connected to the operation terminal 2000 via a network. In this example, the operation terminal 2000 performs only input and output of information, without performing application control processing, and the operation server 2200 performs application control processing.

The operation terminal 2000 has a communicator 2002, a touch panel 2110, a controller 2001, and the controller 2001 has a display controller 2134 and a detector 2131. The touch panel 2110, the controller 2001, the display controller 2134, and the detector 2131 have the same constitutions, respectively, as the touch panel 1110, the controller 1130, the display controller 1134, and the detector 1131 in the fourth embodiment. The communicator 2002 communicates with the operation server 2200 via a network.

The operation server 2200 has a communicator 2201, a controller 2202, and a storage 2203. The controller 2202 has a area identifier 2132, a selection item identifier 2133, and a selection item changer 2135. The storage 2203 has a selection item storage 2121 and an area information storage 2122. The controller 2202, the area identifier 2132, the selection item identifier 2133, the selection item changer 2135, the storage 2203, the selection item storage 2121, and the area information storage 2122 have the same constitutions, respectively, as the controller 1130, the area identifier 1132, the selection item identifier 1133, the selection item changer 1135, the storage 1120, the selection item storage 1121, and the area information storage 1122 in the fourth embodiment. The communicator 2201 communicates with the operation server 2000 via a network.

The systems and methods in the above-described embodiments may be deployed in part or in whole through a machine or hardware processor that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through circuitry configured to perform or implement the methods and systems.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A system comprising:
   a touch panel having a plurality of display areas for displaying a game, wherein the game comprises an action game, and game operation involves real-time operations; and
   a storage storing computer code, and a central processing unit (CPU) which accesses the storage to execute the computer code to:
   detect a touch operation of touching the touch panel at a touch-position in the plurality of display areas on the touch panel, while the touch panel is displaying the game on the plurality of display areas;
   designate a designated display area that includes the touch-position from the plurality of display areas of the touch panel;
   designate associated sets of selection items which are associated with the plurality of display areas, and the associated sets of selection items are different for different display areas of the plurality of display areas;
   communicate with another system to transmit one or more icons to the another system; and
   control the touch panel to display, in response to the touch operation being detected, a plurality of operators;
   wherein the plurality of operators are superimposed on the game displayed and positioned around and in a vicinity of the touch-position without changing relative positions of the plurality of operators relative to the touch-position,
   wherein the plurality of operators are for selecting an icon of the one or more icons to be transmitted,
   wherein each of the plurality of operators includes an associated set of selection items, and
   wherein the CPU executes the computer code to control the touch panel to remove a display of the plurality of operators from the game displayed at a time that the touch operation of touching the touch panel stops being detected at the touch-position.

2. The system according to claim 1,
   wherein the CPU executes the computer code to control the touch panel to remove the display of the plurality of operators in a case that the touch operation is no longer detected at the touch-position.

3. The system according to claim 1,
   wherein the CPU executes the computer code to control the touch panel to display a plurality of guide images, each guide image indicating a respective range of each display area of the plurality of display areas of the touch panel.

4. The system according to claim 1,
   wherein the CPU executes the computer code to control the touch panel to display the plurality of operators which includes the designated associated sets of selection items, the designated associated sets of selection items including colored item images which are different in color depending upon different display areas of the plurality of display areas of the touch panel, and
   wherein the CPU executes the computer code to control the touch panel to display a plurality of guide images which are different in color depending upon different colors of the colored item images.

5. The system according to claim 1, wherein:
   the CPU executes the computer code to change an associated set of selection items into another set of selection items included in the plurality of operators to be displayed on the touch panel, in a case that the touch operation is detected at the touch-position on the touch panel continuously over a period of time.

6. The system according to claim 1, further comprising:
   a storage that stores a plurality of sets of selection items and respective identifiers identifying the plurality of display areas of the touch panel, each set of selection items being associated with a respective identifier which identifies a respective display area of the plurality of display areas of the touch panel.

7. The system according to claim 6,
   wherein the CPU executes the computer code to read, from the storage, the set of selection items, which is associated with an identifier identifying the designated display area, and
   wherein the CPU executes the computer code to control the touch panel to display, at or in the vicinity of the touch-position, the plurality of operators including the set of selection items that have been read from the storage.

8. The system according to claim 1,
   wherein the CPU executes the computer code to stop detecting the touch operation of touching the touch panel, if the touch-position at the first operation item displayed by the touch panel slides and then is no longer detected over one of the selection items, and input of an operation instruction indicating selection of that selection item is accepted.

9. The system according to claim 1,
   wherein the plurality of display areas are respectively associated with plural sets of the selection items,
   wherein the CPU executes the computer code to designate the associated set of selection items which is associated with the designated display area, where the designated display area includes the touch-position at which the touch operation was detected, and wherein the CPU executes the computer code to control the touch panel to display, in response to that the touch operation being detected, the plurality of operators, which include the designated associated set of selection items, on the designated display area.

* * * * *